United States Patent
Iwamura

(10) Patent No.: US 7,602,915 B2
(45) Date of Patent: Oct. 13, 2009

(54) COMMUNICATION SYSTEM HAVING PLURALITY OF NODES SHARING A COMMON CIPHER KEY, CIPHER KEY DISPATCHING APPARATUS FOR USE IN THE SYSTEM, AND ANTI-THEFT APPARATUS UTILIZING INFORMATION DERIVED FROM CIPHER KEY UTILIZATION

(75) Inventor: Takahiro Iwamura, Nishio (JP)

(73) Assignee: DENSO CORPORATION, Kariya (JP)

( * ) Notice: Subject to any disclaimer, the term of this patent is extended or adjusted under 35 U.S.C. 154(b) by 782 days.

(21) Appl. No.: 11/116,415

(22) Filed: Apr. 28, 2005

(65) Prior Publication Data
US 2006/0115085 A1 Jun. 1, 2006

(30) Foreign Application Priority Data

Apr. 28, 2004 (JP) ............................. 2004-133971
Dec. 8, 2004 (JP) ............................. 2004-355907

(51) Int. Cl.
*H04L 9/00* (2006.01)
(52) U.S. Cl. ........................................ 380/259; 380/42
(58) Field of Classification Search .................. 380/37, 380/281, 259, 42, 29, 72, 277; 340/539; 713/201; 173/183; 386/96
See application file for complete search history.

(56) References Cited

U.S. PATENT DOCUMENTS

| | | | |
|---|---|---|---|
| 7,079,655 B1* | 7/2006 | Tochikubo et al. | 380/281 |
| 7,152,693 B2* | 12/2006 | Man et al. | 173/183 |
| 7,167,635 B1* | 1/2007 | Ando et al. | 386/96 |
| 2002/0076044 A1* | 6/2002 | Pires | 380/37 |
| 2003/0206102 A1* | 11/2003 | Joao | 340/539.1 |
| 2005/0182966 A1* | 8/2005 | Pham et al. | 713/201 |

FOREIGN PATENT DOCUMENTS

JP 2002-321569 11/2002

OTHER PUBLICATIONS

"Modern Encoding"; by Okamoto et al, published by Sangyozusho Co., Japan; pp. 198-199(discussed on pp 1 and 2 in the specification).

* cited by examiner

*Primary Examiner*—Kambiz Zand
*Assistant Examiner*—Monjour Rahim
(74) *Attorney, Agent, or Firm*—Posz Law Group, PLC

(57) ABSTRACT

A communication system has a plurality of nodes that perform encrypted communication via a LAN, each using an identical common cipher key. The common cipher key is replaced at fixed or irregular intervals, by being transmitted from a main node in a broadcast mode via the LAN to respective secondary nodes that are to share the key. When the key is successfully received by a secondary node, it returns a confirmation signal. The system can be configured such that a notification list of secondary nodes for which key acquisition has been confirmed is transmitted to all of the secondary nodes.

23 Claims, 16 Drawing Sheets

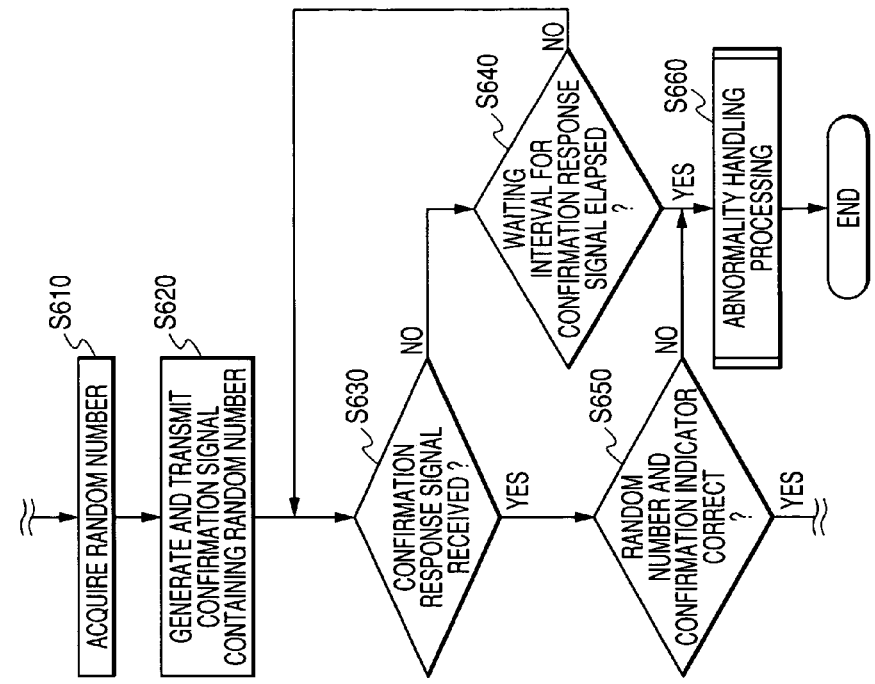
FIG. 13A (GW-SIDE CONFIRMATION PROCESSING)
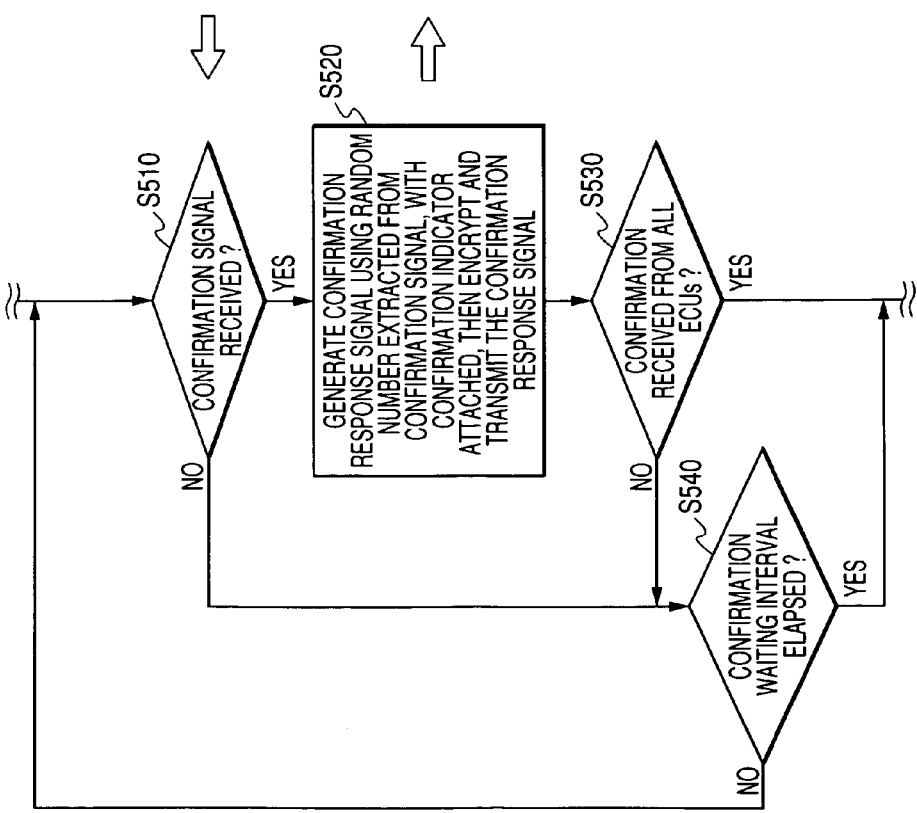
FIG. 13B (ECU-SIDE CONFIRMATION PROCESSING)

| NUMBER OF NODES | NUMBER OF COMMON CIPHER KEYS GENERATED |
|---|---|
| 2 | 1 |
| 3 | 3 |
| 4 | 6 |
| ⋮ | ⋮ |
| N | $\frac{N(N-1)}{2}$ |

COMMUNICATION SYSTEM HAVING PLURALITY OF NODES SHARING A COMMON CIPHER KEY, CIPHER KEY DISPATCHING APPARATUS FOR USE IN THE SYSTEM, AND ANTI-THEFT APPARATUS UTILIZING INFORMATION DERIVED FROM CIPHER KEY UTILIZATION

CROSS-REFERENCE TO RELATED APPLICATIONS

This application is based on and incorporates herein by reference Japanese Patent Application No. 2004-133971 filed on Apr. 28, 2004 and Japanese Patent Application No. 2004-355907 filed on Dec. 8, 2004.

BACKGROUND OF THE INVENTION

1. Field of Application

The present invention relates to a communication system for performing encrypted communication via a data network, and to a cipher key dispatching apparatus that is located at a node of such a communication system, a code processing apparatus, and an anti-theft apparatus that is applicable to a motor vehicle (referred to in the following simply as a "vehicle") having such a communication system installed.

2. Description of the Prior Art

In the prior art, various methods are known for encrypting communication data in order to prevent data theft or unauthorized access to data. With one method of encryption, a cipher key is used in common by persons who perform encrypted communication with one another (with such a cipher key being referred to in the following as a common cipher key). In using such a cipher key, it is important to ensure that only persons who are eligible to participate in the encrypted communication will have access to the common cipher key. One method of achieving this is to use a third party Confirmation technique, for example the SSL (Secure Socket Layer) technique, or Kerberos, etc., whereby a key transfer operation (for dispatching a cipher key to each of respective authorized parties who are to perform mutual encrypted communication) is performed by some trustworthy third party, as described for example in "Modern Encrypting", by Okamoto et al, published by Sangyozusho Co., Japan, p198~199.

Performing such a key transfer operation will be described referring to FIG. 15A. As shown, nodes A and B, which are in mutual encrypted communication, have been previously allocated respectively different individual cipher keys (with such keys being referred to in the following as class cipher keys) designated as Ka and Kb. A key dispatching center S, which is a third-party facility, possesses the class cipher keys Ka, Kb of all of the nodes, recorded beforehand. When for example node A is to communicate with node B, it sends notification (of this intention to communicate) to the key dispatching center S, with that notification indicated as (A,B) in FIG. 15A, whereupon the key dispatching center S generates a cipher key Kab that can be used as a common cipher key for communication between the nodes A and B. The key dispatching center S then uses the respective class cipher keys Ka, Kb of the nodes A, B in conjunction with the common cipher key Kab to generate respective code words (i.e., respective sets of encrypted data) Ea and Eb. The key dispatching center S then sends each of these code words Ea, Eb to the node A. Node A then uses its class cipher key Ka to decrypt the code word Ea, and thereby acquire the common cipher key Kab. Node A then uses this common cipher key Kab to generate a code word Eabs, and sends that code word together with the code word Eb (received from the key dispatching center S) to the node B.

Node B thereupon uses its class cipher key Kb to decrypt the code word Eb, and thereby acquire the common cipher key Kab. Node B then uses the common cipher key Kab to decrypt the code word Eabs, and if the decrypting is successful, node B then uses the common cipher key Kab to generate a code word Eabr, and sends this to node A. Thereafter, node B can perform encrypted communication with node A by using the common cipher key Kab, and node A can similarly communicate with node B, i.e., when the node A receives the code word Eabr, it uses the common cipher key Kab to decrypt that code word, and if the decryption is successful, it uses the common cipher key Kab to communication with node B. The common cipher key Kab is thereby shared by the nodes A and B.

In the case of a communication system that is installed in a vehicle, in order to achieve a high degree of control and to facilitate servicing, apparatuses such as ECUs (Electronic Control Units), etc., constituting nodes of the system are connected via a vehicle LAN (Local Area Network) for sharing of information relating to equipment of the vehicle. It is expected that encrypting of such communication within a vehicle LAN will soon begin to be utilized, to achieve increased security.

If a common cipher key method of encrypted communication were to be applied to a vehicle LAN, then as shown in FIG. 5B, it would be necessary to be able to allocate respective common cipher keys to each of the possible combinations of ECUs that are connected to the vehicle LAN. Thus if the total number of ECUs is designated as N, it would be necessary to be able to provide a total of [N×(N−1)/2] common cipher keys. Typically, a vehicle LAN may have more than ten ECUs (or several tens of ECUs) connected to it, so that it would become necessary to provide a capability for generating a very large number of common cipher keys.

Furthermore when utilizing encrypting communication using common cipher keys, in order to enhance security, it is necessary to periodically change the common cipher keys, by performing a key replacement operation. However since such an operation must be done for all of the ECUs of a vehicle, the time actually available for communication within the vehicle LAN would be restricted, due to the amount of time required to perform such an operation, which includes dispatching of respective cipher keys to the various ECUs, and confirmation of correct reception of the cipher keys by the respective ECUs, as illustrated in FIG. 6.

Hence, if such a key replacement operation were to be performed for a vehicle LAN, with a large number of common cipher keys being necessary as described above, then a large amount of processing time would be required for generating the (new) common cipher keys, and for distributing these common cipher keys to the ECUs.

It might be envisaged for example that such a key replacement operation would be executed each time that the vehicle ignition is switched on. However in that case, communication between the ECUs would be enabled only after the key replacement operation has been completed, so that a normal control condition would not established until after a substantially long interval has elapsed. Thus, the vehicle driver would be given an adverse impression.

Such problems are not limited to vehicle LANs, but are applicable in general to LANs for which a high speed of response is required.

Furthermore, in Europe and the USA in recent years, the problem of vehicle thefts has become severe. These thefts are performed in some cases for the purpose of acquiring the vehicles, however in many cases, theft is performed in order to strip the vehicle of its equipment, such as ECUs, etc., for sale as vehicle parts. It would be desirable to provide a communication system for a motor vehicle which would reduce the incentive for vehicle thefts to acquire equipment of the vehicles, and thereby reduce the incidence of such thefts.

SUMMARY OF THE INVENTION

It is an objective of the present invention to overcome the above problems of the prior art, by providing a communication system in which encrypted communication is performed via one or more LANs through use of common cipher keys, whereby the time required to perform a key replacement operation can be substantially reduced, where the term "key replacement operation", as applied to the present invention, signifies a process of generating a changed version of a common cipher key, dispatching that changed version to each of respective nodes within the system that have been predetermined as permitted to share that common cipher key and obtaining confirmation of acquisition of the newly changed key by these nodes. However if a key replacement operation is re-executed (i.e., to re-dispatch the same common cipher key when necessary), then the confirmation operation may be modified or omitted, as described hereinafter.

It is a further objective of the invention to provide a communication system which inherently reduces an incentive for theft of equipment constituting nodes of a vehicle LAN in the communication system.

To achieve the above aspects, according to a first aspect the invention provides a communication system having at least one LAN, with three or more nodes connected to the LAN, whereby communication data are encrypted or decrypted to perform encrypted communication by using a cipher key that is acquired by each of the nodes through a key replacement operation and is held by each of the nodes and used in common until a subsequent key replacement operation.

With such a communication system, it is only necessary to generate a single common cipher key each time that a key replacement operation is to be executed, irrespective of the total number of nodes, so that the time required to perform cipher key generation is reduced.

Specifically, if the number of nodes which utilize such a common cipher key is N, the number of keys that must be generated before performing a key replacement operation is $2/\{N(N-1)\}$ times the number that is required in the prior art. Hence, the greater the number of nodes in the system, the greater becomes the advantageous effect obtained by the present invention.

Furthermore in the case of a vehicle LAN, or a similar type of LAN, communication is performed only between a limited set of nodes, i.e., this is a closed communication system in which communication is not performed between an unspecified number of nodes. With such a communication system, even if all of the nodes share the same cipher key for use in encrypted communication, there is no substantial lowering of the degree of security as a result of such key sharing. Hence, the present invention is especially applicable to such a type of communication system.

With a communication system according to the present invention, a specific one of the nodes that are connected to a LAN (or a node that is connected to a plurality of LANS) functions as a "main node", which periodically performs a key replacement operation of generating a changed version of the common cipher key, and dispatching that key to each of a plurality of other nodes that are connected to the LAN(s). These other nodes will be referred to as the "secondary nodes" in the following. The main node dispatches the (new) common cipher key to all of the secondary nodes by using a broadcast mode of LAN data transmission, when executing a key replacement operation.

In that way, not only is the time required to generate cipher keys reduced, but also the time required to dispatch the cipher keys to various nodes is also reduced by comparison with the prior art.

Furthermore, in order to ensure secrecy of the common cipher key that is dispatched in a key replacement operation, the common cipher key itself is preferably encrypted before being dispatched. For that purpose, each of the nodes is provided beforehand with a cipher key, referred to herein as a class cipher key, that is identical for each of the nodes and is held unchanged, and which is used by the secondary nodes to decrypt an encrypted common cipher key that is received as a result of a key replacement operation.

Key replacement operations can be performed at fixed periodic intervals, or in response to an externally supplied command. Alternatively, with a communication system whose operation is halted and started comparatively frequently such as an in-vehicle communication system, it may be preferable to perform a key replacement operation each time that operation of the communication system is started, i.e., in general, each time the vehicle ignition is switched on. In that case, when the communication system is activated, a key replacement operation can be executed in parallel with performing initialization of various data processing sections of the system. When such initialization has been completed, encrypted communication between respective nodes via the LAN can immediately be started, so that the system can quickly be brought into full operation.

With the present invention, such a communication system can be configured such that when a secondary node receives a common cipher key in a key replacement operation, it returns a confirmation signal to the main node, and such that when the main node finds that there is a secondary node that should receive and use this common cipher key but has not returned a confirmation signal, the main node repeats the key replacement operation, but without changing the common cipher key.

That is to say, it is possible that during a key replacement operation (in which the main node dispatches a common cipher key to each of respective secondary nodes, as described above) a secondary node may not succeed in receiving that common cipher key, or the main node may not succeed in receiving a confirmation signal that is transmitted from a secondary node. Thus, the main node may fail to receive a confirmation signal from a secondary node for some reason other than a failure condition of the main node or of that secondary node. For example, such a condition may result from interference by electrical noise, etc.

By re-executing the key replacement operation in that way when necessary, it can be ensured that encrypted communication by the secondary nodes will not be obstructed by any cause other than failure of a node. Furthermore, the communication system can be configured such that when re-execution of the key replacement operation is performed, the main node broadcasts to each of the secondary nodes (via the LAN) a list which indicates those secondary nodes for which reception of the common cipher key has not been confirmed, i.e., whose confirmation signals have not been received by the main node. In that case, only each secondary node for which a confirmation signal was not received by the main node in the immediately preceding execution of the key replacement operation will then send a confirmation signal back to the main node in response to the re-execution of the key replacement operation.

Thus when such a re-execution of the key replacement operation is performed, the main node will only require to perform processing relating to any secondary node which did not send back a confirmation signal in response to the preceding execution of that key replacement operation. Hence, unnecessary processing, relating to secondary nodes for which cipher key acquisition has already been confirmed by the main node, can be substantially eliminated. Thus the overall amount of processing relating to such a re-execution of a key replacement operation can be reduced.

Alternatively, the system can be configured such that before executing a key replacement operation, the main node broadcasts via the LAN a list of those secondary nodes which are to share the common cipher key that will be dispatched in that key replacement operation. Such a list is referred to in the following as a notification list. In that case, only when a secondary node receives the notification list and finds that it is registered in that list, and then receives the common cipher key that is dispatched in the key replacement operation, will that secondary node return a confirmation signal to the main node via the LAN.

Furthermore such a system can be configured such that if the main node finds that after executing the key replacement operation, there are one or more secondary nodes that are listed in the notification list but from which a confirmation signal has not been received, the main node then broadcasts a modified notification list, which indicates only the secondary node(s) from which no confirmation signal has been received, and then re-executes the key replacement operation.

Since such a modified notification list specifies only those secondary nodes from which no confirmation signal has been received, i.e., only those secondary nodes will then transmit confirmation signals back to the main node, unnecessary processing relating to nodes for which confirmation has been received can be eliminated.

From another aspect, such a communication system can be configured such that each secondary node generates a confirmation signal as a random number, when a common cipher key has been received in a key replacement operation, i.e., with that random number being attached to ID information for that secondary node, with the resultant confirmation signal then being encrypted by using the (newly received) common cipher key, and the encrypted confirmation response signal then transmitted to the main node via the LAN. With such a system, the main node is preferably configured to decrypt each such confirmation signal when received, to thereby extract the random number (and the identity of the corresponding secondary node), and to then attach a predetermined set of data (supplied beforehand to the main node and each of the secondary nodes, to be continuously held in memory) referred to herein as a "confirmation indicator" to the extracted random number, to thereby form a confirmation response signal. That confirmation response signal is then encrypted by using the common cipher key, and transmitted via the LAN to the secondary node which originated the confirmation signal.

In that case, each confirmation signal that is generated by each secondary node will be different, i.e., will contain a different random number, Thus, it would not be possible for a person wishing to install unauthorized items (e.g., stolen ECUs) as nodes in such a system to simply record the signals that are transmitted between the nodes, and configure the unauthorized items to generate identical signals, since the contents of the confirmation signals and of the confirmation response signals are different between the various nodes and also change at each execution of a key replacement operation. In addition, only an authorized item that is utilized as a node in such a system can attach the correct confirmation indicator to transmitted confirmation signals and confirmation response signals, so that this further helps to effectively prevent the use of unauthorized items, such as stolen ECUs, in such a communication system.

From another aspect, the invention provides a cipher key dispatching apparatus that is constituted by one of the nodes of a communication system having at least one LAN utilized for encrypted communication between a plurality of nodes. Such an apparatus includes cipher key generating means for successively generating changed versions of a common cipher key for use in the encrypted communication, i.e., with such changing being performed in key replacement operations that are executed at regular or irregular intervals. The apparatus further includes key dispatching means, provided beforehand with a class cipher key (i.e., held fixedly stored in memory by each of the nodes, and identical for each of the nodes) for encrypting and then transmitting the common cipher key to each of the other nodes, via the LAN, using a broadcast communication mode. The apparatus moreover includes key confirmation list generating means for receiving confirmation signals that are transmitted via the LAN from other ones of the nodes in response to receiving the encrypted common cipher key, and for generating a key confirmation list, which lists those nodes from which confirmation signals have been received, and list dispatching means for transmitting the key confirmation list to the other nodes via the LAN, using the broadcast communication mode.

A communication system having such a cipher key dispatching apparatus may be configured such that only a specific set of nodes are permitted to share the common cipher key. In that case, the cipher key dispatching apparatus can be configured with re-dispatching means for detecting a condition in which at least one of the nodes that are permitted to share the common cipher key has not transmitted a confirmation signal after a key replacement operation has been executed, and for re-transmitting the common cipher key via the LAN (using the broadcast communication mode) when the condition is detected.

The aforementioned key confirmation list generating means can be configured to generate the key confirmation list as a list of nodes from which no confirmation signals have been received up to a point at which a predetermined waiting interval has elapsed, following the commencement of transmitting the common cipher key by the key dispatching means.

According to another aspect, the invention provides a cipher key dispatching apparatus that is constituted by one of the nodes (i.e., a main node as described above) of a communication system having at least one LAN for encrypted communication between a plurality of nodes (i.e., secondary nodes), and which includes, in addition to means for generating and transmitting updated common cipher keys as described above, notification list generating means. This generates a notification list as a list of nodes which are permitted to share the common cipher key, and transmits the list to the secondary nodes via the LAN using the broadcast communication mode.

In that way, each secondary node is notified as to whether or not it is eligible to receive and use the common cipher key.

Such a key dispatching apparatus can further comprise re-dispatching means for receiving respective confirmation signals transmitted from nodes which have received the common cipher key dispatching by the key dispatching means, and for detecting a condition whereby one of the nodes which are listed in the notification list has not transmitted a confirmation signal. When that condition is detected, a modified notification list is generated, which specifies the node which has not transmitted a confirmation signal, and that list is then broadcast via the LAN, while in addition the common cipher key is re-transmitted via the LAN.

In that way, when the unconfirmed node (i.e., from which no confirmation signal has been received) receives the modified key confirmation list, and finds itself specified therein, then only that node will respond by transmitting a confirmation signal. Hence, processing to transmit and receive unnecessary confirmation signals is eliminated.

The above and other aspects of the invention will be made apparent from the following description of preferred embodiments.

BRIEF DESCRIPTION OF THE DRAWINGS

FIGS. 13A, 13B respectively show flow diagrams of GW-side confirmation processing and ECU-side confirmation processing that are executed by a fifth embodiment;

DESCRIPTION OF PREFERRED EMBODIMENTS

First Embodiment

Figure 1:
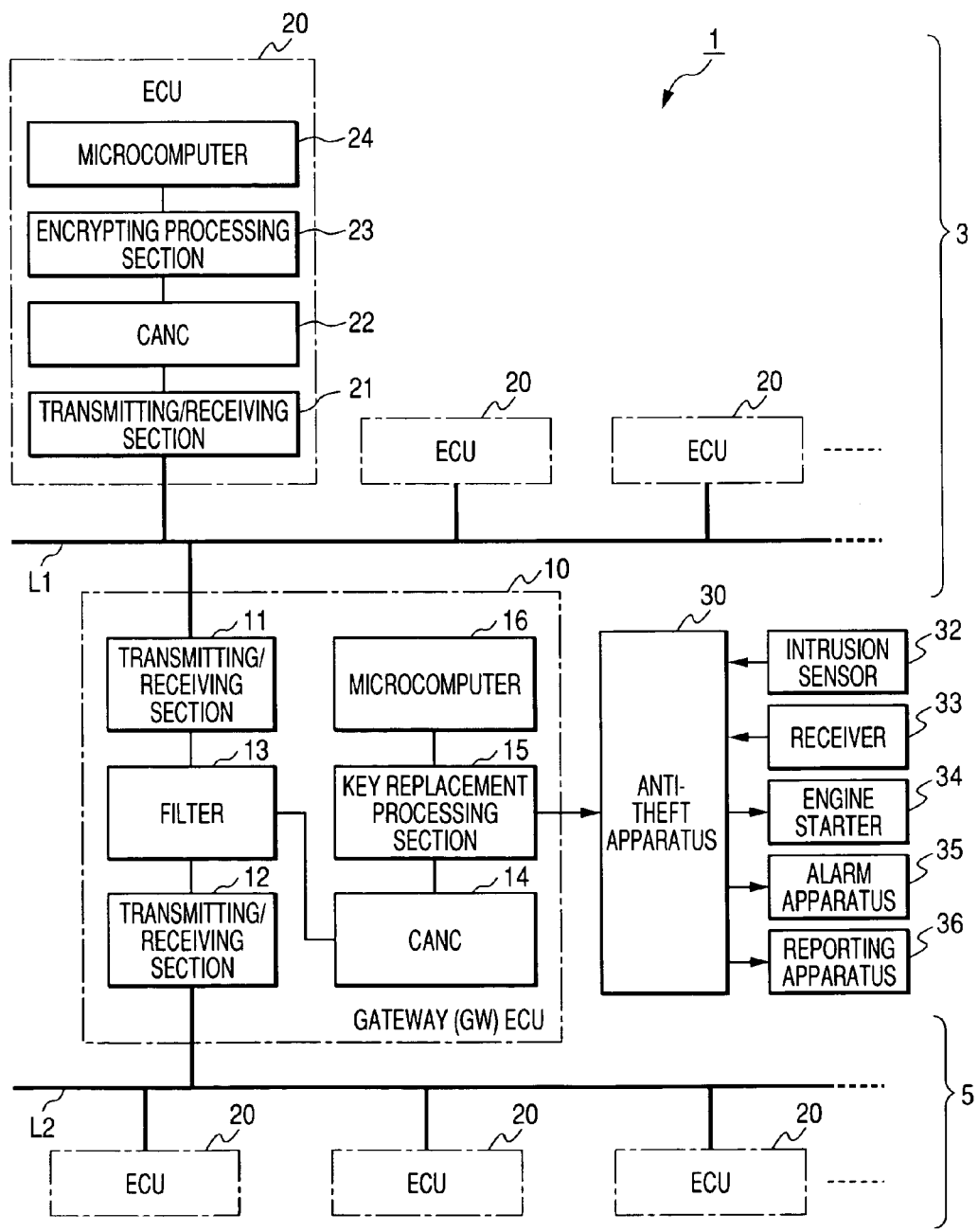
FIG. 1 is a general system diagram applicable to each of respective embodiments of a vehicle control system according to the present invention.

FIG. 1 shows a vehicle control system 1 which is applicable to a first embodiment of the invention, described in the following, and also to other embodiments of the invention described hereinafter. The system 1 has communication lines L1 and L2 which are utilized as data buses, and will be referred to simply as buses, with a plurality of ECUs 20 connected to the bus L1 to constitute a first vehicle LAN, designated by numeral 3 and a plurality of ECUs 20 connected to the bus L2 to constitute a second vehicle LAN, designated by numeral 5. The vehicle control system 1 further includes a gateway ECU 10 which is connected to both of the vehicle LANs 3 and 5, and a anti-theft apparatus 30 whose function is to prevent theft of a vehicle in which the vehicle control system 1 is installed.

Each of the ECUs 20 has the internal configuration shown, formed of a transmit/receive section 21 which serves as an interface for sending/receiving data to/from the corresponding one of the buses L1 or L2, a CAN (Controller Area Network) controller 22 which controls communication performed via the corresponding bus L1 or L2 by using the CAN protocol, a code processing section 23 which performs encrypting/decrypting of data that are transmitted/received via the CAN controller 22 and which also performs encrypting when the ECU 20 is performing ECU-side confirmation processing as described hereinafter. Each ECU 20 further includes a microcomputer 24 which consists mainly of a CPU (central processing unit), ROM (read-only memory), RAM (random access memory), and I/O (input/output) section. The microcomputer 24 controls the CAN controller 22 to effect communication with other ECUs 20, and performs various processing relating to functions that are allocated to that specific ECU and also functions which are performed in conjunction with other ECUs.

Although not shown in the drawing, the I/O section of a microcomputer 24 may be connected directly to various equipment such as sensors and activators, etc., for performing the functions that are assigned to that particular ECU 20. In addition, although not shown in the drawing, the code processing section 23 of each ECU 20 includes a rewritable memory for storing a key confirmation list, which is a list of ECUs that are able to perform encrypted communication with the ECU 20 of that code processing section 23, and the common cipher key that is used in encrypting and decrypting of data to perform such communication. The code processing section 23 further includes a non-volatile memory in which is held stored a class cipher key (i.e., which has been stored therein before the vehicle control system 1 is put into use), which is used in decrypting an updated version of the common cipher key, that is received by the ECU 20 in a key replacement operation. Each ECU 20 is configured such that the microcomputer 24 can refer to the key confirmation list that is held in the rewritable memory of the code processing section 23.

The class cipher key that is held in the non-volatile memory of the code processing section 23 is common to the gateway ECU 10 and all of the ECUs 20 in the vehicle control system 1 of a vehicle. However respectively different class cipher keys are allocated to different vehicles.

Each ECU 20 is made up of transmit/receive sections 11 and 12, a CAN controller 14, and a microcomputer 16 which is similar to the microcomputer 24 of an ECU 20. However the transmit/receive section 11 is connected to the bus L1, while the transmit/receive section 12 is connected to the bus L2.

The gateway ECU 10 includes a filter 13, which selectively control transfer or blocking of data that are received from the buses L1, L2 by the transmit/receive sections 11, 12. Specifically, the filter 13 serves to determine whether data supplied to the filter from bus L1 or bus L2 or from the CAN controller 14 are to be passed or blocked, based on the intended destination of the data.

It should be noted that the invention is not limited to use of the CAN protocol, and would be equally applicable to a communication system having a LAN which implements some other type of communication protocol.

The gateway ECU 10 further includes a key replacement processing apparatus 15 which controls the CAN controller 14 for effecting communication with other ECUs, and performs GW-side confirmation processing (described hereinafter), and also notifies the anti-theft apparatus 30 of any abnormality of operation of any of the ECUs 20 that are connected to the vehicle LANs 3 and 5.

The key replacement processing apparatus 15 includes a random number generating apparatus (not shown in the drawings) for generating random numbers that are used in producing successively changed versions of a common cipher key, a rewritable memory (not shown in the drawings) for storing a key confirmation list, and a non-volatile memory (not shown in the drawings) having stored therein beforehand the aforementioned class cipher key that is also held stored by each ECU 20.

The random number generating apparatus can for example be a pseudo-random number generating apparatus, a clock, or an apparatus which utilizes noise to generate random numbers.

The gateway ECU 10 and each ECU 20 are activated when the vehicle ignition becomes switched on, i.e., when electric power begins to be supplied to various equipment of the vehicle, however the anti-theft apparatus 30 remains in continuous operation at all times. In each ECU 20, when ignition switch-on occurs, internal circuits of the microcomputer 24 are initialized, then initialization of the CAN controller 22 is performed by the microcomputer 24. Thereafter, the code processing section 23 of that ECU 20 autonomously executes ECU-side confirmation processing, i.e., without requiring to receive commands from the microcomputer 24 for performing that processing.

In the ECU-side confirmation processing, the code processing section 23 acquires a new (i.e., currently valid) version of the common cipher key, and confirms (to the gateway ECU 10) that this common cipher key has been acquired. Thereafter this ECU 20 can perform encrypted communication with other ECUs 20 by encrypting and decrypting of locally generated communication data and received communication data, using the newly acquired common cipher key.

In that way, upon completion of the initialization processing by the microcomputer 24 and the ECU-side confirmation processing by the code processing section 23, the microcomputer 24 of each ECU 20 begins normal processing to execute the functions that have been allocated to that ECU 20. In performing this processing, the microcomputer 24 executes encrypted communication with other ones of the ECUs 20, and controls operations of the vehicle in conjunction with the other ECUs 20, i.e., based on sharing of data among the ECUs 20 through encrypted communication between them.

Figure 2:
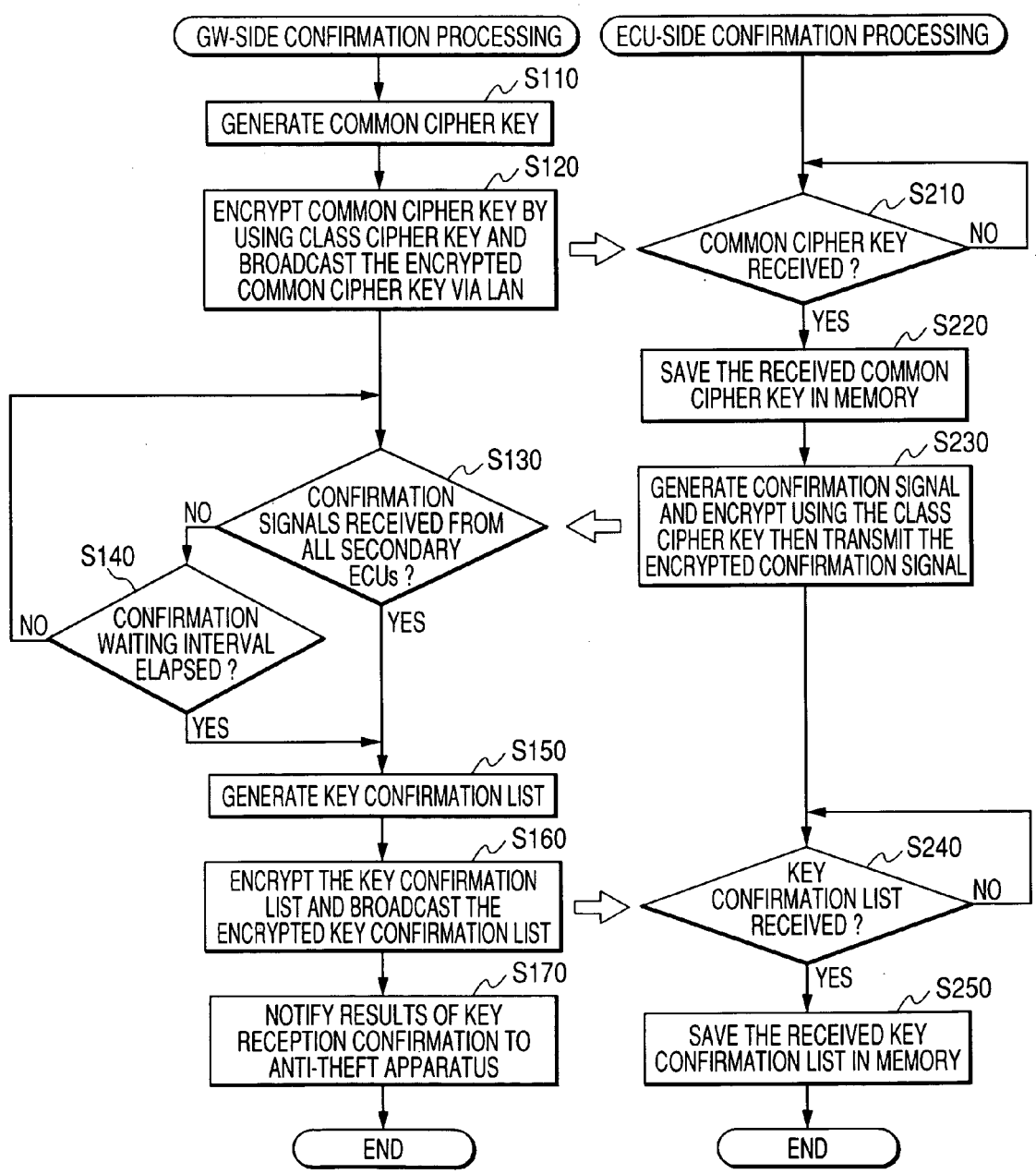
FIG. 2 shows flow diagrams of GW-side confirmation processing and ECU-side confirmation processing that are executed by a first embodiment.

FIG. 2 is a flow diagram showing details of the GW-side confirmation processing that is executed by the key replacement processing apparatus 15 of the gateway ECU 10 to generate and send a newly generated version of the common cipher key to the ECUs 20, and the ECU-side confirmation processing that is executed by the code processing section 23 of each ECU 20 for acquiring that common cipher key and confirming that it has been acquired. In the GW-side confirmation processing, firstly the common cipher key is generated by using the random number generating apparatus (step S110). The generated common cipher key is then encrypted, using the class cipher key, and the resultant encrypted data are dispatched concurrently to all of the ECUs 20, using the broadcast communication mode.

A decision is made as to whether confirmation signals, indicating successful acquisition of the common cipher key, have been received from all of the ECUs 20 (step S130). If there is a NO decision, then step S140 is executed in which a decision is made as to whether a predetermined confirmation waiting interval has elapsed, from the point at which the encrypted common cipher key was dispatched by the gateway ECU 16 (e.g., an interval that has elapsed following start-up of operation of the communication system). If there is a NO decision in step S140, then step S130 is again executed, while if there is a YES decision in step S130 or S140 then step S150 is executed. In step S150, a key confirmation list is generated, which lists each of the ECUs 20 from which confirmation signals have been received by the gateway ECU 10.

In addition to the fact that the distributed common cipher key is encrypted as described above (using the class cipher key), each ECU 20 uses the received common cipher key to encrypt a confirmation signal, before returning that confirmation signal to the gateway ECU 10. When the gateway ECU 10 receives a confirmation signal from a ECU 20, it decrypts that signal by using the common cipher key, and only enters that ECU 20 in the key confirmation list if the decrypting provides a successful result.

The key confirmation list is then encrypted, using the common cipher key, and the resultant encrypted data are dispatched by the gateway ECU 10 to each of the ECUs 20, using the broadcast communication mode (step S160). In addition, the results of the confirmation processing are supplied to the anti-theft apparatus 30 (step S170). Specifically, if any of the ECUs 20 has failed to correctly confirm that it has received the common cipher key, the anti-theft apparatus 30 is notified that an abnormality has occurred. This processing sequence then ends.

The ECU-side confirmation processing will be described in the following. Firstly, operation waits until encrypted data conveying a common cipher key are received, dispatched in the broadcast communication mode by the gateway ECU 10. When such encrypted data are received, the class cipher key is used to decrypt the received data and thereby acquire the common cipher key, which is then stored in memory (step S220).

A confirmation signal is then generated, and encrypted using the received common cipher key, and transmitted to the gateway ECU 10 (step S230).

Operation then waits until encrypted data sent in the broadcast communication mode, i.e., conveying the key confirmation list, are again received (step S240), and when these encrypted data are received they are decrypted using the common cipher key (obtained in step S220), to thereby recover the key confirmation list, which is then stored in a memory that can be accessed by the microcomputer 24 (step S250). This processing sequence then ends.

Thereafter, the microcomputer 24 of each ECU 20 that is registered in the key confirmation list can perform encrypted communication with each of the other ECUs 20 which appear in that list.

Figure 3:
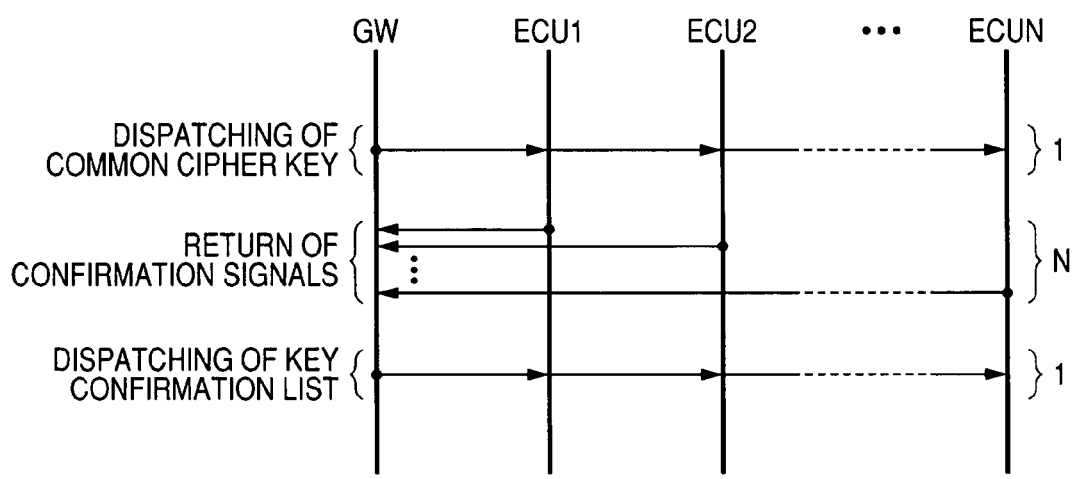
FIG. 3 is a diagram for illustrating flows of data that occur during execution of confirmation processing in a cipher key replacement operation of the first embodiment.

Thus as a result of the confirmation processing that is executed as described above by each of the ECUs 20, as illustrated in FIG. 3, a common cipher key that has been newly generated by the gateway ECU 10 is encrypted and distributed concurrently to all of the ECUs 20 (indicated as ECU1 to ECU10 in FIG. 3) in the broadcast communication mode. Each ECU 20 that correctly receives the encrypted common cipher key then transmits a confirmation signal to the gateway ECU 10, which has been encrypted by using the newly acquired common cipher key. The gateway ECU 10 thereby generates a key confirmation list indicating each of the ECUs 20 from which a confirmation signal has been correctly received, and that key confirmation list is then encrypted using the common cipher key. Then encrypted key confirmation list is then dispatched to each of the ECUs 20, using the broadcast communication mode.

The anti-theft processing that is executed by the anti-theft apparatus 30 will be described referring to FIG. 4. Firstly, as shown in FIG. 1, the anti-theft apparatus 30 receives information indicative of the results of the key confirmation processing described above, from the key replacement processing apparatus 15 of the gateway ECU 10. The anti-theft apparatus 30 also receives from the intrusion sensor 32 a signal indicating whether or not the presence of an intruder in the vehicle interior has been detected. In addition, the receiver 33 receives various commands such as commands to implement engine starting, etc., that are transmitted from a portable transmitter (i.e., a remote control device, carried by the vehicle driver), and supplies input data to the anti-theft apparatus 30 accordingly. Based on these input data, the anti-theft apparatus 30 can control the engine starter 34, to start the vehicle engine, or send warning signals to the alarm apparatus 35 whereby warning indications (such as flashing of the interior lamps of the vehicle, flashing of the hazard lamp, tail lamps, headlamps, sounding of the vehicle horn, etc.) are produced. The anti-theft apparatus 30 can also supply signals to the reporting apparatus 36 whereby the reporting apparatus 36 sends reports by radio to a security company, police, etc., external to the vehicle. The anti-theft apparatus 30 is maintained in continuous operation.

Figure 4:
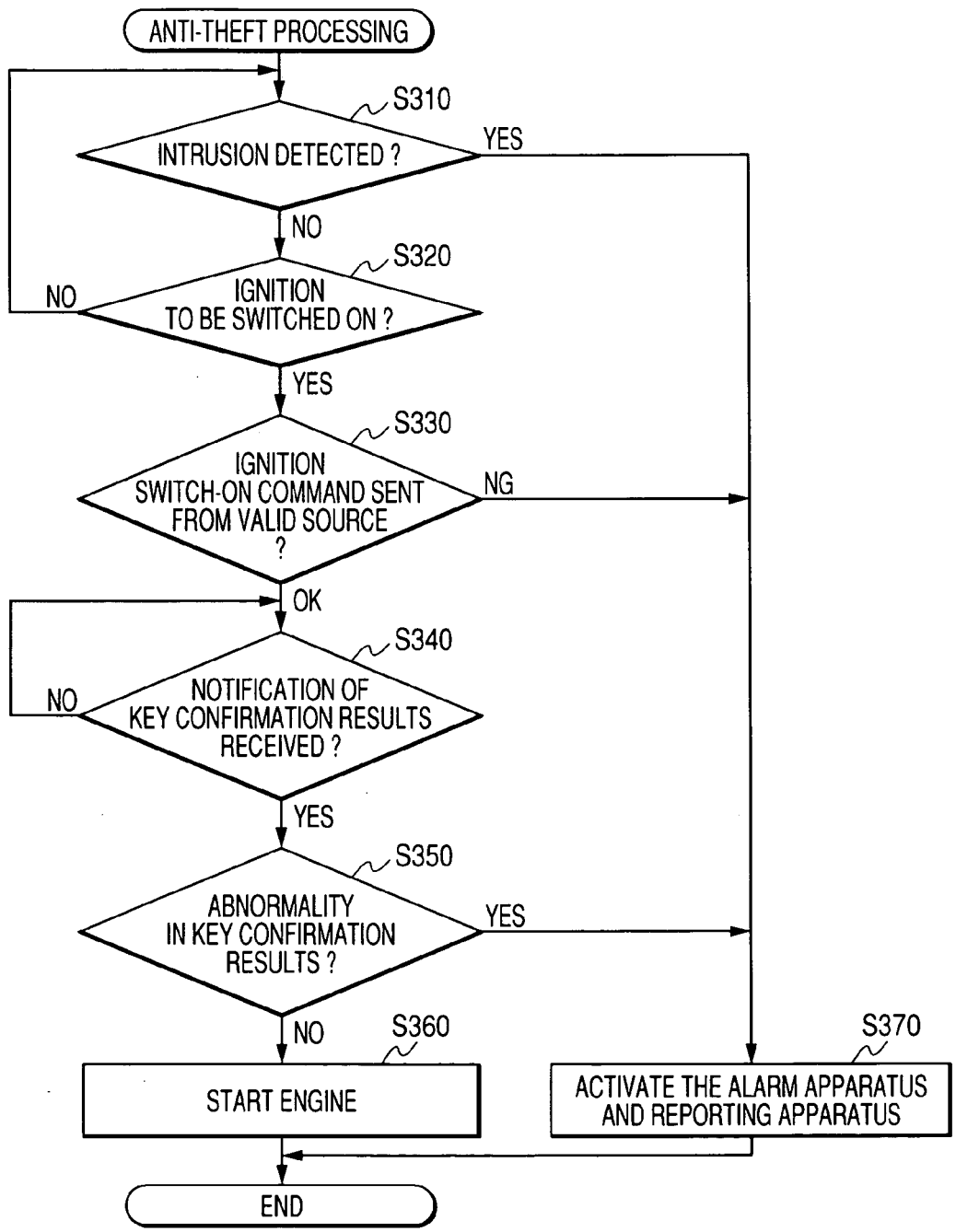
FIG. 4 is a flow diagram of processing executed by an anti-theft apparatus shown in FIG. 1.

The anti-theft processing executed by the anti-theft apparatus 30 is shown in FIG. 4. Firstly in step S310 a decision is made as to whether an intrusion into the vehicle has been detected. If there is a NO decision, step S320 is executed, in which a decision is made as to whether a command has been received by the receiver 33 designating that the ignition is to be switched on. If there is a NO decision, operation returns to step S310. Thus, until an ignition switch-on command is received, or an intrusion is detected, the anti-theft apparatus 30 operates in a waiting condition in which steps S310, 320 are repetitively executed.

If an intrusion is detected, i.e., a YES decision in step S310, step S370 is executed, in which the alarm apparatus 35 is activated so that warning indications are generated in and around the vehicle as described above, while in addition the reporting apparatus 36 is activated, to report the intrusion to a security company or police, etc.

If it is found that a command has been received for ignition switch-on (YES decision in step S320), then the anti-theft apparatus 30 judges whether that command has been received by radio from a portable transmitter that is a valid device, i.e., is authorized for use with this vehicle. If the result of the validation confirmation is negative (NG decision in step S330), then step S370 is executed to activate the alarm apparatus 35 and the reporting apparatus 36 as described above.

If the validity confirmation is successful (OK decision in step S330) then operation waits until the results of the common cipher key confirmation (described hereinabove) are received from the key replacement processing apparatus 15 of the gateway ECU 10. When the confirmation results are received (i.e., YES decision in step S340), a decision is made as to whether the results are satisfactory (step S350). If it is found that the confirmation results are abnormal, then step S370 is executed to activate the alarm apparatus 35 and the reporting apparatus 36 as described above. If the confirmation results are normal, then engine starting is performed (step S360). After execution of step S360 or step S370, this processing sequence ends.

Thus with this embodiment, as illustrated in FIG. 3, a common cipher key is generated by a single ECU (in this embodiment, the gateway ECU 10), and distributed to all of the ECUs 20 concurrently, using the broadcast communication mode. Hence, the number of cipher keys required, and the amount of processing necessary to enable sharing of a common cipher key among all of the nodes of the communication system, is greatly reduced by comparison with a prior art type of method in which cipher keys are distributed individually.

Furthermore with this embodiment, since the common cipher key is changed, and a key replacement operation performed to supply the new common cipher key to each of the ECUs, each time that the vehicle control system 1 is activated, a high degree of security can be achieved. Moreover since the time required to distribute the common cipher key to the ECUs is short, execution of the key replacement operation does not result in any significant increase in the time required to perform activation of the vehicle control system 1.

Moreover with this embodiment, in which the vehicle control system 1 is installed in a vehicle, if a stolen ECU were to be connected to either of the vehicle LANs 3 or 4, such a stolen ECU would not be capable of performing normally when a key replacement operation is executed. Thus, the key replacement processing apparatus 15 of the gateway ECU 10 would obtain a confirmation result (i.e., from the key replacement operation) that is abnormal, so that the alarm apparatus 35 and the reporting apparatus 36 would be automatically activated by the anti-theft apparatus 30, while in addition, engine starting would be inhibited by the anti-theft apparatus 30.

As a result, if the owner of the vehicle were to purchase a stolen ECU, it could not actually be utilized. Hence, it would become meaningless for persons to purchase such stolen items, and this would inherently result in a reduction of the number of vehicles that are stolen for the purpose of obtaining ECUs.

Second Embodiment

With a second embodiment, the operation differs from that of the first embodiment described above only with respect to a part of the GW-side confirmation processing that is executed by the microcomputer 16 of the gateway ECU 10, and a part of the ECU-side confirmation processing that is executed by the microcomputer 24 of each ECU 20.

Figure 5:
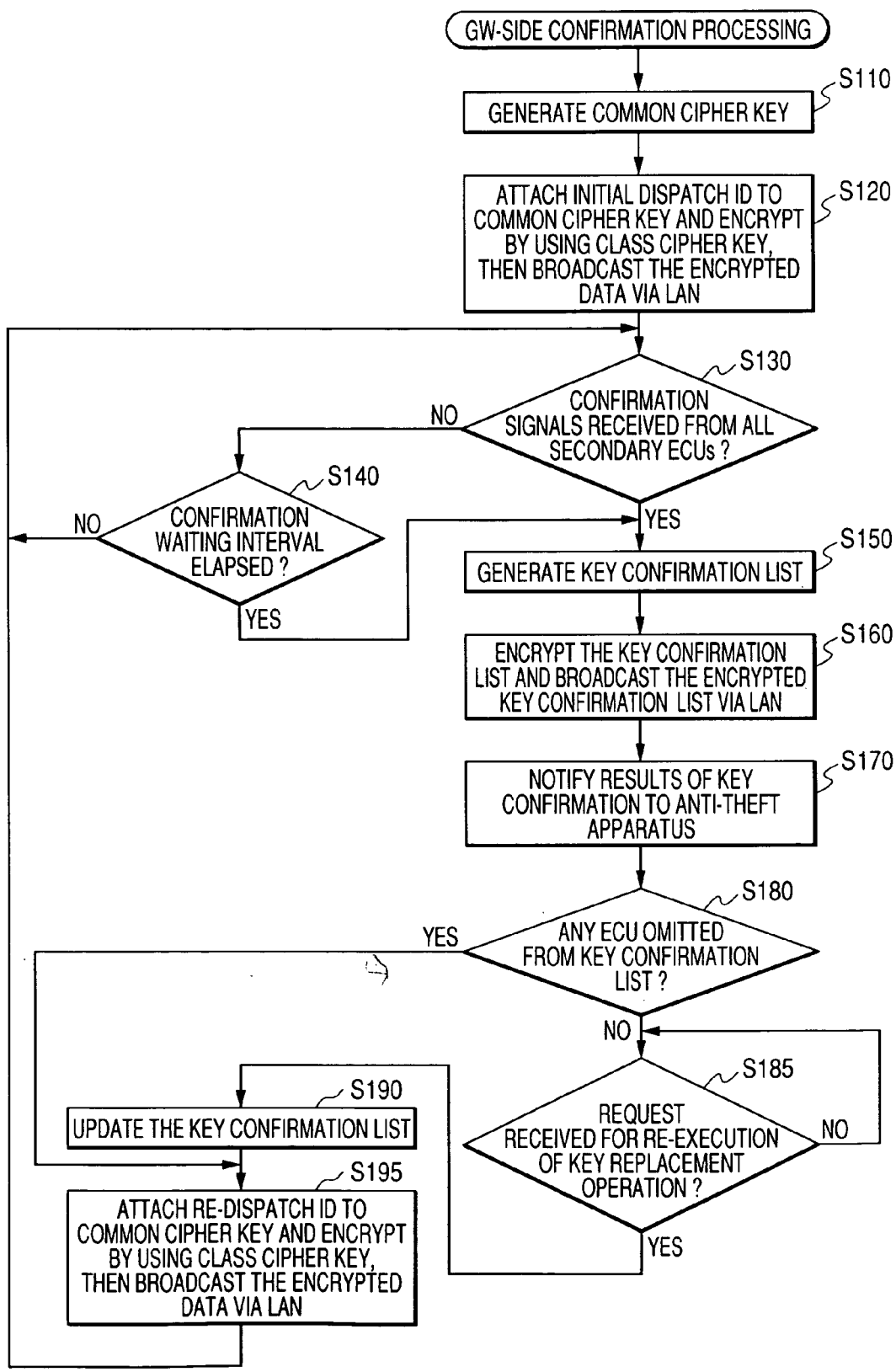
FIG. 5 is a flow diagram of GW-side confirmation processing that is executed by a second embodiment.

Firstly, the GW-side confirmation processing of the second embodiment will be described referring to the flow diagram of FIG. 5. Processing steps corresponding to those of the first embodiment are indicated by corresponding reference numerals to those of the first embodiment, and detailed description of these will be omitted.

Specifically, steps S110 to S170 are identical to those of the first embodiment. However as shown in FIG. 5, after notification of the key confirmation results have been supplied to the anti-theft apparatus 30, a decision is made (in step S180) as to whether there is any ECU 20 that is to share the common cipher key but is not yet registered in the key confirmation list that is generated in step S150. In the following, such an ECU that is not yet listed will be referred to as an unregistered ECU. If it is found that there is no unregistered ECU 20, then operation waits to receive a request signal for re-execution of the key replacement operation, sent via the LAN 3 or LAN 5 from one of the ECUs 20 (step S185). When such a re-execution request signal is received, the ECU 20 that originated the request signal is deleted from the key confirmation list (step S190). The common cipher key that was previously dispatching in step S120 is then re-dispatched to the ECUs 20 in the same manner, i.e., using the broadcast communication mode. Operation then returns to step S130.

If it is found in step S180 that there is an ECU 20 that has not yet been registered in the key confirmation list, then step S195 is directly executed, to re-dispatch the common cipher key. However in order to enable the ECUs 20 to distinguish between the initial dispatch of the common cipher key (in step S120) and a re-dispatch of the common cipher key (performed in step S195), the following measure is adopted. In the re-dispatch operation of step S195, the encrypted data conveying the common cipher key are transmitted, using the CAN protocol, with an ID (referred to in the following as the re-dispatch ID) attached that is different from an ID (referred to in the following as the initial dispatch ID) that is attached to the encrypted data of the initial dispatch (performed in step S120).

The ECU-side confirmation processing of the second embodiment will be described referring to the flow diagram of FIG. 6. Processing steps corresponding to those of the first embodiment are indicated by corresponding reference numerals to those of the first embodiment shown in FIG. 1, and detailed description of these will be omitted. In the following, to avoid confusion, the actual ECU 20 whose processing is being described using FIG. 6 will be referred to as "this ECU 20".

Specifically, in steps S210 to S240 of FIG. 6, in the same way as for the first embodiment, if it is judged in step S210 that the common cipher key has not been received after this ECU 20 has been activated, or if a NO decision is reached in a step S245 (described hereinafter), then a decision is made as to whether a predetermined waiting interval for receiving the common cipher key has elapsed (step S270). If that interval has not elapsed, operation returns to step S210, while if it has elapsed, operation proceeds to step S275, in which this ECU 20 transmits to the gateway ECU 10 a request signal for re-dispatch of the common cipher key (S275). Operation then returns to step S210.

If it is judged in step S240 that the key confirmation list has been received, then a decision is made as to whether this ECU 20 is registered in that key confirmation list (step S245). If it is not registered in the list, then operation returns to step S210.

In that case, when the aforementioned waiting time for receiving the common cipher key has elapsed (i.e., a YES decision in step S270), a request signal for execution of the key replacement operation is transmitted to the gateway ECU 10 (step S275).

However if it is judged in step 5245 that this ECU 20 is registered in the key confirmation list, then that list is stored in memory (step 5250). Operation then enters a condition of waiting to detect any recurrence of a common cipher key being transmitted from the gateway ECU 10 (step S260). If that does not occur, then this processing sequence will eventually be terminated when the vehicle ignition is switched off.

If some other ECU 20 transmits a request for re-execution of the key replacement operation (i.e., due to step S275 being executed by that other ECU 20) after this ECU 20 has executed step S220 to store the common cipher key, or if for some reason the gateway ECU 10 is temporarily deactivated then reactivated while the ignition is still switched on after this ECU 20 has executed step S220, so that a common cipher key is again dispatched by the gateway ECU 10 to each ECU 20, then step S265 is executed.

In step S265 a decision is made as to whether the newly received cipher key (i.e., received as a set of encrypted data having the aforementioned ID attached) has the re-dispatch ID attached thereto. If it is the re-dispatch ID (signifying that some other ECU 20 has requested re-dispatching of the same common cipher key which had been received and stored by this ECU 20 in step S220), then operation returns to step S240, without transmitting a confirmation signal or storing the newly received common cipher key.

However it is judged in step S265 that the ID attached to the encrypted data conveying the common cipher key is not the re-dispatch ID (i.e., is the aforementioned initial dispatch ID) then this signifies that the newly received common cipher key has been dispatched from the gateway ECU 10 as a result of the gateway ECU 10 being restarted. Thus, the newly received common cipher key is different from that which was received and stored by this ECU 20 in step S220. Hence in that case, operation returns to step S220. The newly received common cipher key is thereby decrypted using the class cipher key and stored in memory, and a confirmation signal is sent back to the gateway ECU 10.

Figure 7A:
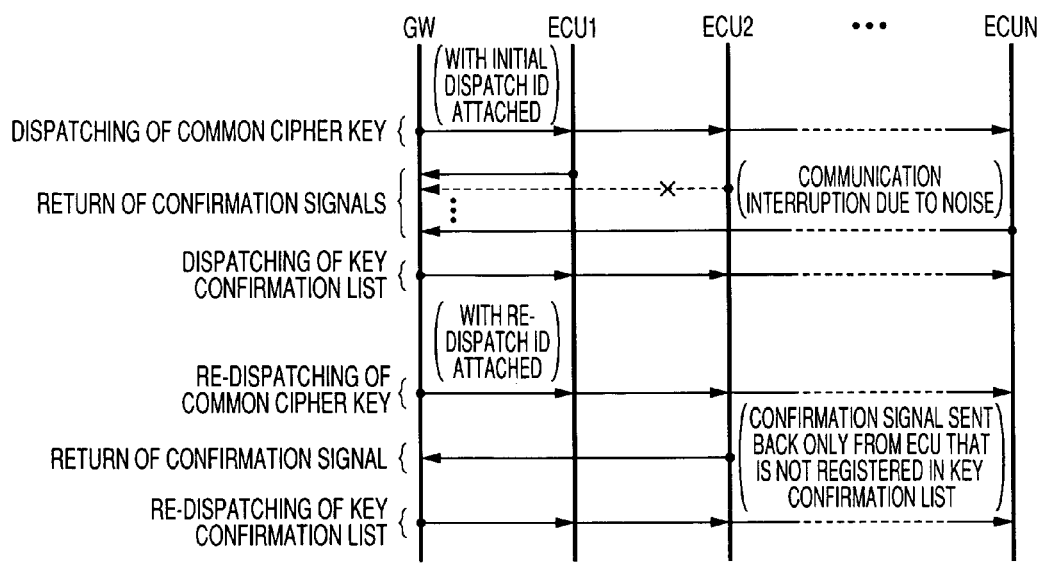
FIGS. 7A, 7B are diagrams for illustrating flows of data that occur during execution of confirmation processing in a cipher key replacement operation of the second embodiment.

When the gateway ECU 10 and each ECU 20 perform the above processing, then as shown in FIG. 7A, the gateway ECU 10 first dispatches a newly generated common cipher key (encrypted using the class cipher key), and that key is decrypted and stored by each of the ECUs 20 which successfully receive it. In addition, these ECUs 20 transmit respective individual confirmation signals (each encrypted using the received common cipher key) back to the gateway ECU 10 in response.

However if any of these ECUs 20 (i.e., the ECU2, of the ECUs 1 to N in FIG. 7A) does not succeed in having its confirmation signal received by the gateway ECU 10, for example due to the effects of noise, etc., then the gateway ECU 10 removes the ECU2 from the key confirmation list. The gateway ECU 10 then encrypts that key confirmation list, using the common cipher key, and dispatches the list to each of the ECUs 20, using the broadcast communication mode. Each ECU 20 then stores the received key confirmation list.

The gateway ECU 10 then again dispatches the common cipher key (i.e., which was precedingly transmitted as described above) to each of the ECUs 20 using the broadcast communication mode, with the re-dispatch ID attached to the encrypted data conveying the common cipher key. When this occurs, only the ECU2, which detects that it is not registered in the key confirmation list, responds by transmitting a confirmation signal back to the gateway ECU 10.

On receiving this confirmation signal, the gateway ECU 10 updates the key confirmation list by adding to it the ECU2, then dispatches this updated key confirmation list to each of the ECUs 20, using the broadcast communication mode. Each of the ECUs 20 then stores this updated key confirmation list in memory.

Figure 6:
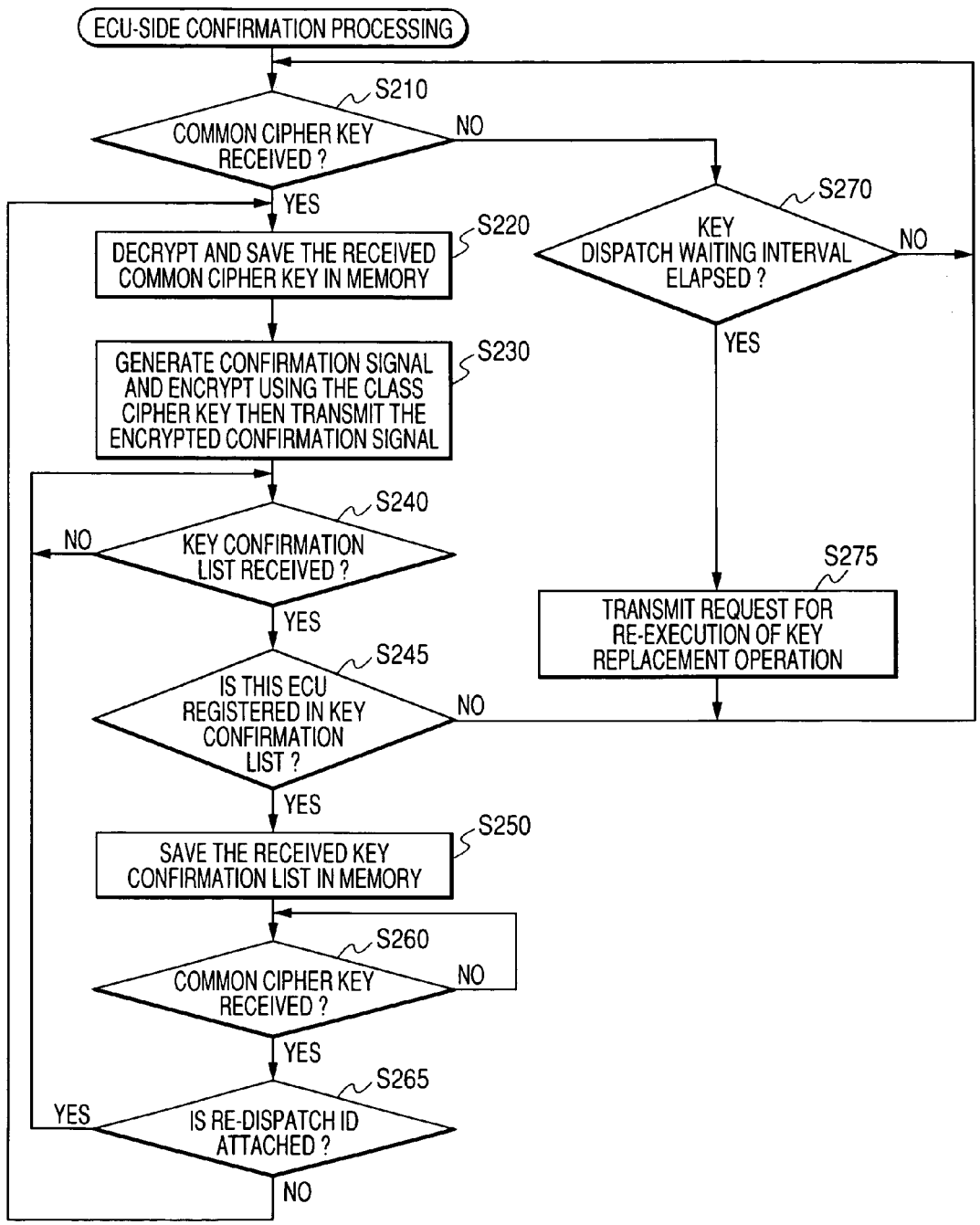
FIG. 6 is a flow diagram of ECU-side confirmation processing that are executed by the second embodiment.
Figure 7B:
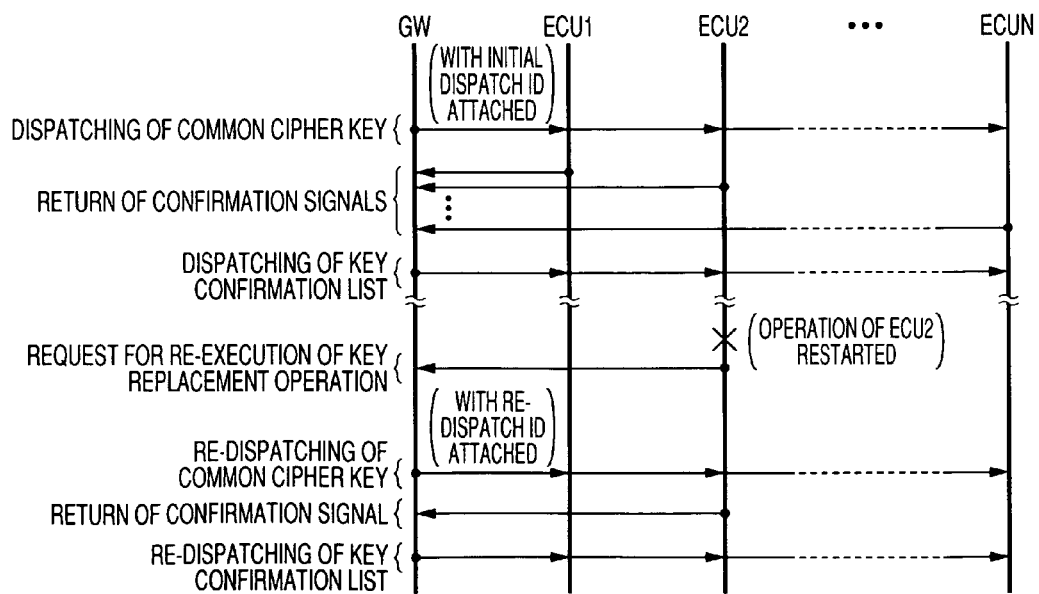

Also as illustrated in FIG. 7B, after a key replacement operation has been completed successfully, if one of the ECUs 20 which share the common cipher key temporarily ceases and then restarts its operation (in the example of FIG. 7B, the ECU2) for some reason, then upon restarting, the ECU2 transmits to the gateway ECU 10 a request signal for re-execution of the key replacement operation (i.e., ECU2 performs step S275 of FIG. 6, after the waiting interval judged in step S270 has elapsed). The gateway ECU 10 responds by re-dispatching the same common cipher key that had been dispatching prior to the ECU2 becoming inactivated then reactivated, using the broadcast communication mode, with the re-dispatch ID attached to the data conveying that key. The ECU2 responds by transmitting the confirmation signal back to the gateway ECU 10, and the gateway ECU 10 then dispatches the key confirmation list to each of the ECUs 20.

Thus as described above, with this embodiment of the vehicle control system 1, in addition to the processing that is executed for the first embodiment, the gateway ECU 10 performs a re-execution of the key replacement operation when it is found that one of the ECUs 20 that should each share the common cipher key has not returned a confirmation signal in response to the initial dispatching of the common cipher key. Furthermore, when any of the ECUs 20 is not successful in receiving the common cipher key or the key confirmation list from the gateway ECU 10, that ECU 20 then transmits a request signal to the gateway ECU 10 for re-dispatching of the common cipher key. In response, the gateway ECU 10 repeats the processing to broadcast the common cipher key (i.e., the most recently generated version of that key) to each of the ECUs 20.

Hence with the vehicle control system 1 of this embodiment, further advantages are obtained with respect to the first embodiment, in that when a communication failure occurs for an ECU 20, or an ECU 20 temporarily ceases operation and is then reactivated, that ECU 20 can reliably acquire the currently valid version of the common cipher key. Hence even if communication interruptions should occur due to some external cause (i.e., electrical noise, etc.), it is ensured that this will not hinder the exchange of encrypted data, so long as there is no failure or abnormality of operation of the gateway ECU 10 or the ECUs 20.

Furthermore with this embodiment, only an ECU 20 that is not registered in the key confirmation list is required to return a confirmation signal after re-dispatching of the common cipher key, i.e., it is unnecessary for the ECUs 20 that have succeeded in acquiring the common cipher key in the initial execution of the key replacement operation to perform processing relating to the re-dispatching. Thus, unnecessary processing is avoided, and the overall amount of processing is minimized.

Third Embodiment

A third embodiment will be described in the following, which differs from the first embodiment only with respect to the GW-side confirmation processing that is executed by the microcomputer 16 of the gateway ECU 10, and the ECU-side confirmation processing that is executed by the microcomputer 24 of each ECU 20.

Figure 8:
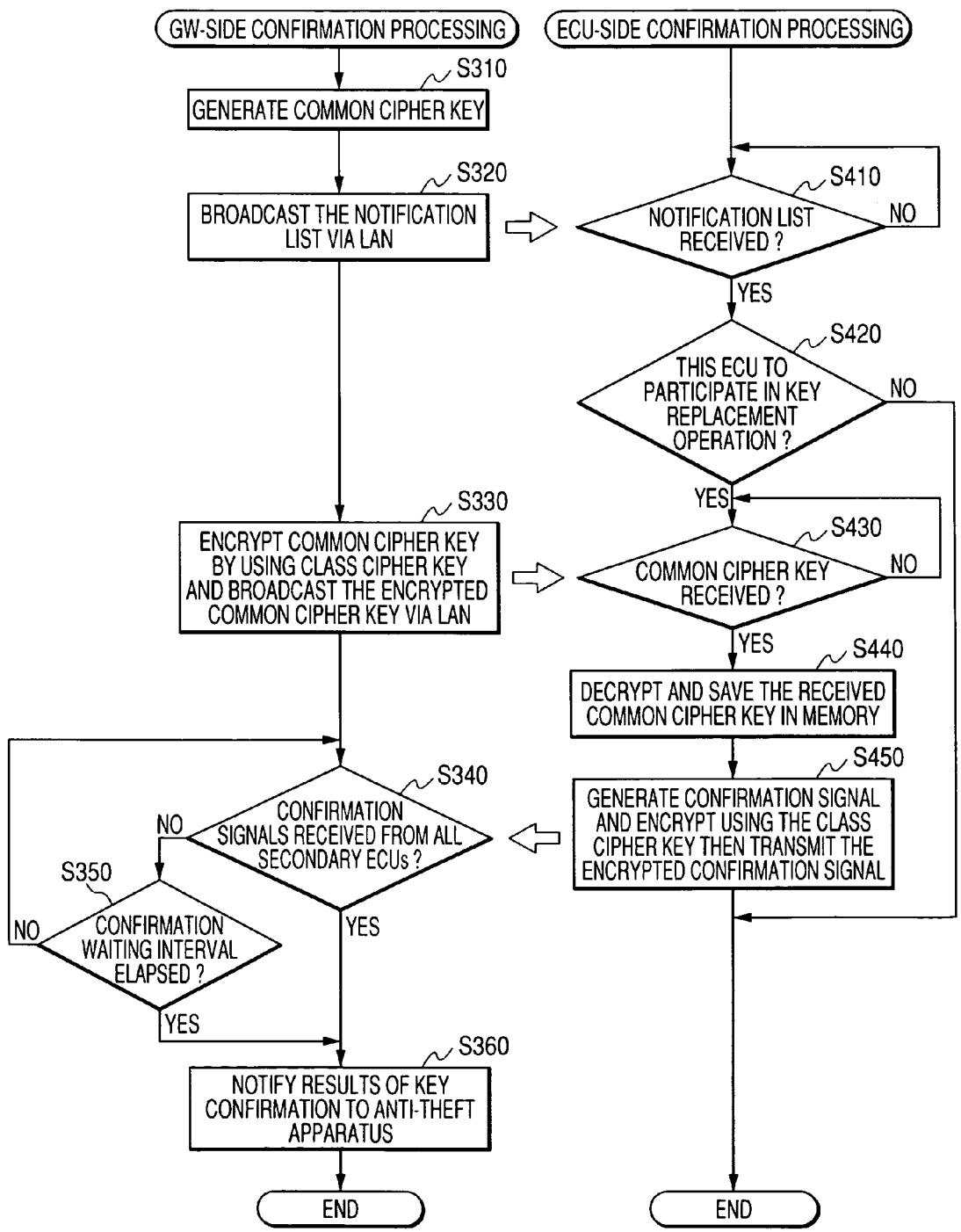
FIG. 8 shows flow diagrams of GW-side confirmation processing and ECU-side confirmation processing that are executed by a third embodiment.

FIG. 8 is a flow diagram showing details of the GW-side confirmation processing that is executed by the key replacement processing apparatus 15 of the gateway ECU 10, and the ECU-side confirmation processing that is executed by the code processing section 23 of each ECU 20 with the third embodiment. In the GW-side confirmation processing shown in FIG. 8, firstly a common cipher key is generated by using a random number generating apparatus, then a notification list is generated which shows each of the ECUs 20 that are to share this common cipher key. That list is then dispatched concurrently to each of the ECUs 20, using the broadcast communication mode (step S320). This notification list may be transmitted directly, or may be encrypted (using the class cipher key) before being transmitted.

Next, the common cipher key generated in step S310 is encrypted, using the class cipher key, and the resultant encrypted data are transmitted to each of the ECUs 20, using the broadcast communication mode (step S330). A decision is made as to whether confirmation signals (as described above for the preceding embodiments) have been received from each of the ECUs 20 which are registered in the notification list (step S340). If it is found that a confirmation signal has not been received from one or more of these ECUs 20, then operation waits until a predetermined time interval has elapsed for receiving the confirmation signals (step S350). If that time interval has elapsed, or if confirmation signals have been received from all of the ECUs 20 which are registered in the notification list, operation proceeds to step S360. In step S360, the results of acquiring the confirmation signals from the various ECUs 20 are supplied to the anti-theft apparatus 30 (step S360), and this processing sequence then ends.

As described hereinabove, each confirmation signal is encrypted (using the newly acquired common cipher key) by an ECO 20 before being transmitted to the gateway ECU 10, and the gateway ECU 10 decrypts the respective confirmation signals received from those ECUs 20 that appear in the notification list. If the decrypting is successful for the confirmation signals from all of these ECUs 20, the gateway ECU 10 notifies the anti-theft apparatus 30 that there is no abnormality in the key confirmation results. If there is any ECU 20 for which no confirmation signal has been received, or an ECU 20 which has transmitted a confirmation signal that could not be successfully decrypted by the gateway ECU 10, then this is notified to the anti-theft apparatus 30 as an abnormality in the key confirmation results.

In the ECU-side confirmation processing shown in FIG. 8, firstly each ECU 20 waits to receive the notification list that is broadcast by the gateway ECU 10 (step S410). When the notification list is received, a decision is made as to whether this ECU 20 is registered in the notification list, i.e., as to whether it is necessary for this ECU 20 to participate in a key replacement operation (step S420). If this ECU 20 does not appear in the notification list, this processing sequence ends. However if it is registered in the notification list, the ECU 20 waits to receive a new common cipher key from the gateway ECU 10 (step S430). Upon receiving the encrypted data conveying this key, it is decrypted (using the class cipher key) and stored in memory (step S440).

This ECU 20 then generates a confirmation signal and encrypts that signal using the newly acquired common cipher key, in the same way as described for the preceding embodiments, with the resultant encrypted data being transmitted to the gateway ECU 10 (step S450). This processing sequence then ends.

Thereafter, the microcomputer 24 of a ECU 20 that has transmitted a confirmation signal to the gateway ECU 10 can perform encrypted communication with other ECUs 20 that are registered in the key confirmation list.

Figure 9:
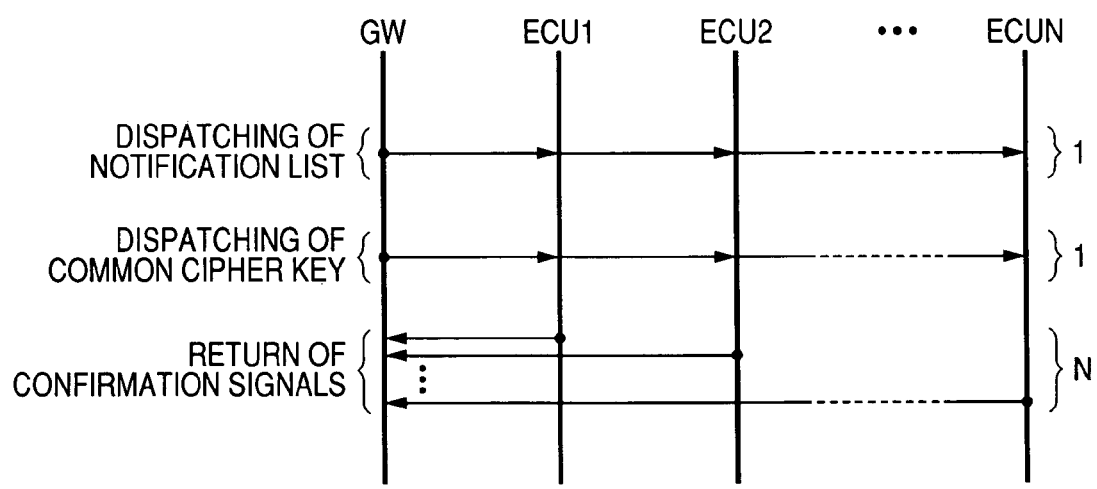
FIG. 9 is a diagram for illustrating flows of data that occur during execution of confirmation processing in a cipher key replacement operation of the third embodiment.

The above is illustrated in FIG. 9, in which the notification list and the common cipher key that has been encrypted using the class cipher key, are successively dispatched to all of ECU1 to ECUN concurrently, using the broadcast communication mode. When an ECU 20 receives the notification list and the common cipher key, and finds that it is registered in the notification list, it returns a confirmation signal (encrypted using the newly acquired common cipher key) to the gateway ECU 10.

Thus this embodiment, instead of transmitting a key confirmation list to each of the ECUs 20 after a key replacement operation has been executed, a notification list which expresses each of the ECUs for which a key replacement operation must be performed (i.e., which are to share the new common cipher key) is dispatched to each of the ECUs 20. In other respects, the operation of this embodiment is identical to that of the first embodiment, and similar effects to those of the first embodiment can be attained.

Fourth Embodiment

A fourth embodiment will be described in the following, which differs from the third embodiment only with respect to parts of the GW-side confirmation processing that is executed by the microcomputer 16 of the gateway ECU 10 and the ECU-side confirmation processing that is executed by the microcomputer 24 of each ECU 20. Only these points of difference from the third embodiment will be described in the following. It should be noted that in the following description, the term "notification list" signifies a list of all of the ECUs 20 that are to share a common cipher key, as for the preceding embodiments, but the term "modified notification list" has a different significance, defined hereinafter.

Figure 10:
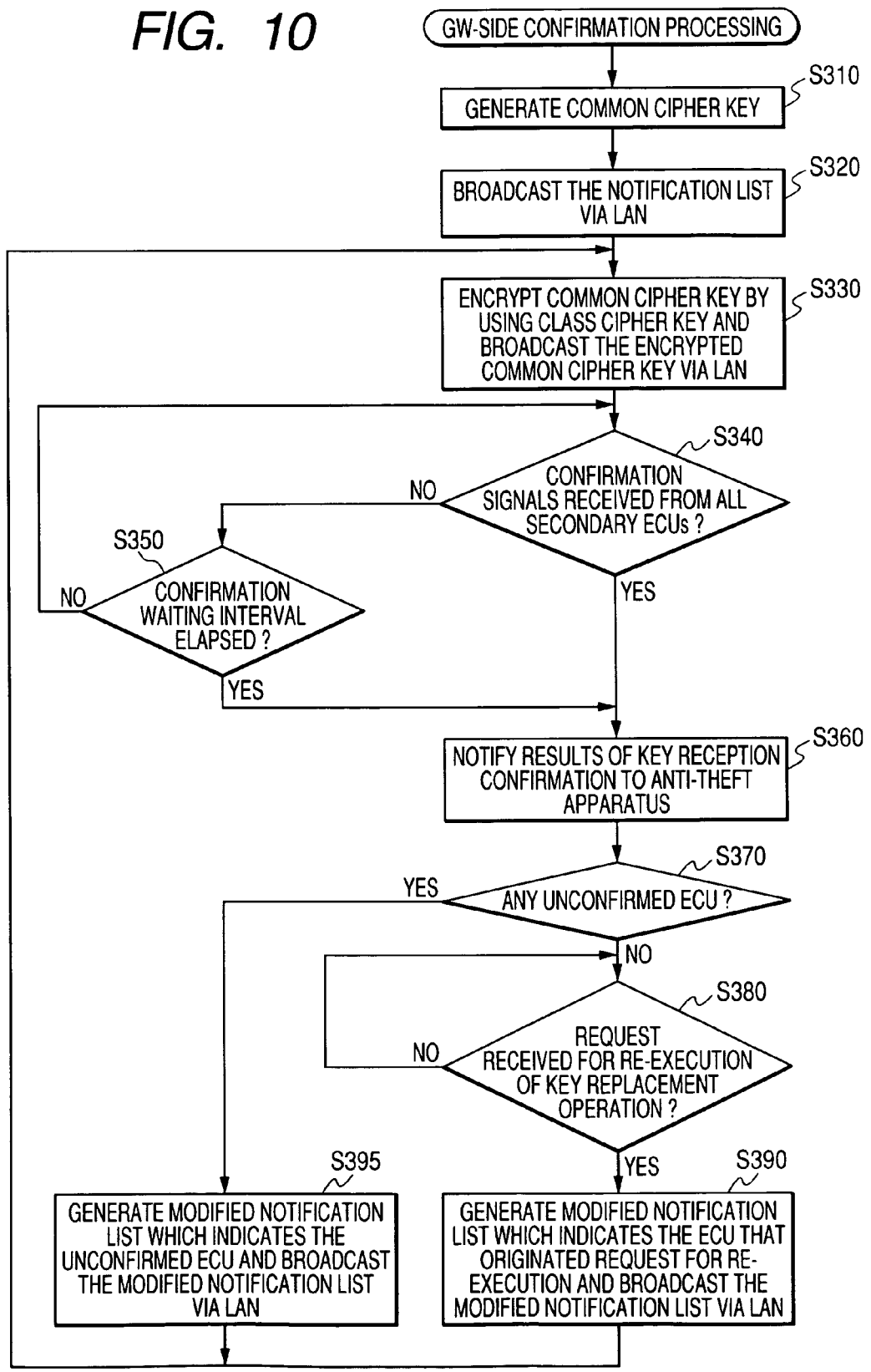
FIG. 10 is a flow diagram of GW-side confirmation processing that is executed by a fourth embodiment.

FIG. 10 is a flow diagram showing details of the GW-side confirmation processing performed with the fourth embodiment. Following steps S310 to S350 of FIG. 10, executed in the same way as for the third embodiment, after notifying the anti-theft apparatus 30 of the results of the key confirmation processing in step 5360, a decision is made as to whether any of the ECUs 20 which are registered in the notification list (dispatched in step S320 to each ECU 20) has not yet returned a confirmation signal (step S370). Such an ECU 20 that has not yet returned a confirmation signal will be referred to as an unconfirmed ECU in the following.

If it is found that there is no unconfirmed ECU, then operation waits to receive any request signal for re-dispatching of the common cipher key (step S380). If such a signal is received, the gateway ECU 10 generates a modified notification list that specifies those ECUs 20 which have requested re-execution of the key replacement operation, and dispatches that modified notification list to each of the ECUs 20, using the broadcast communication mode (step S390). Operation then returns to step S330.

However if it is found in step S370 that there is at least one unconfirmed ECU, then the gateway ECU 10 generates a modified notification list, which specifies each unconfirmed ECU (i.e., for notifying each such ECU that no confirmation signal has been received from it), and transmits that modified notification list in the broadcast communication mode to each of the ECUs 20 (step S395). Operation then returns to step S330.

Figure 11:
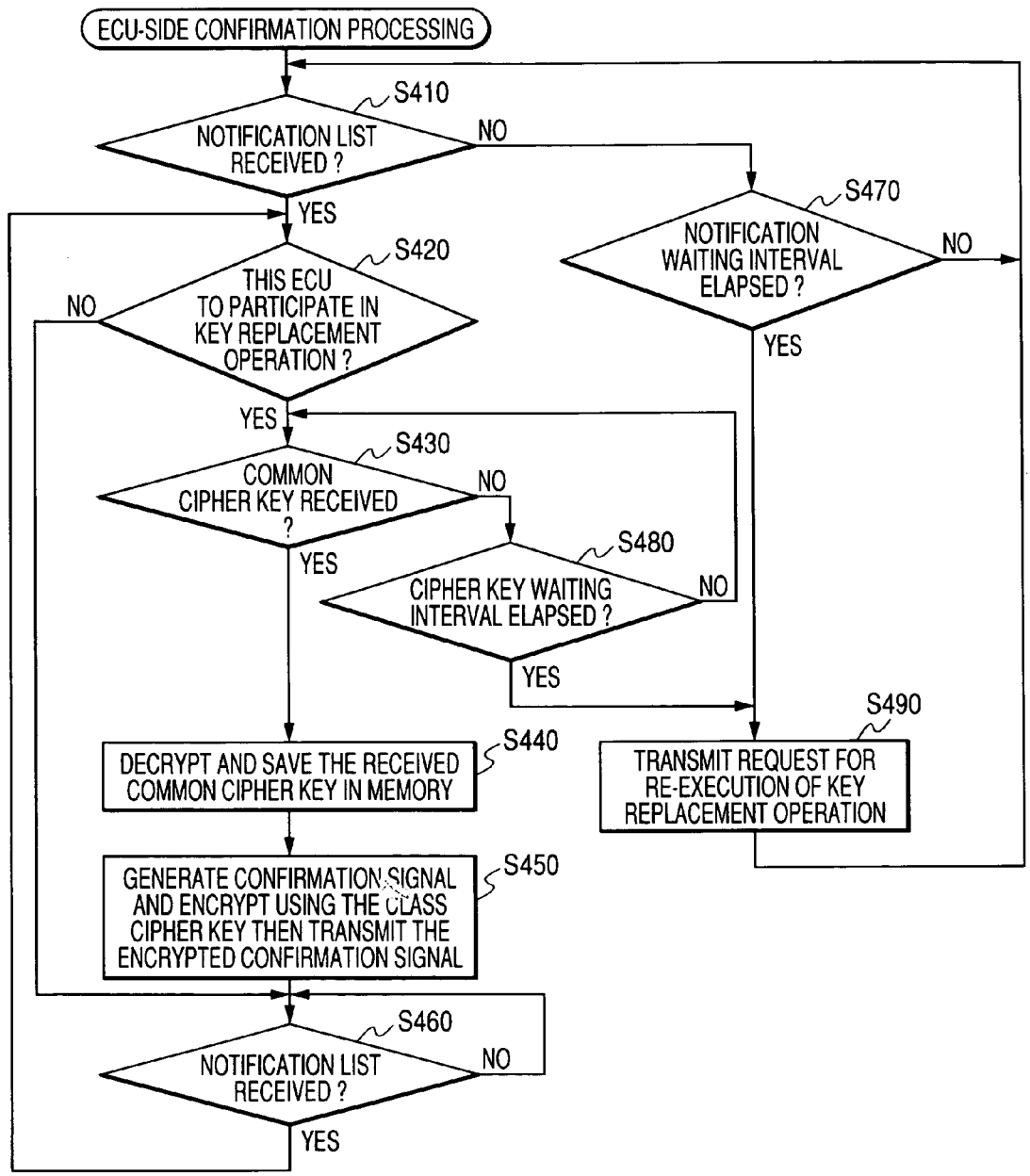
FIG. 11 is a flow diagram of ECU-side confirmation processing that are executed by the fourth embodiment.

The ECU-side confirmation processing that is executed with the fourth embodiment will be described referring to the flow diagram of FIG. 11. Processing steps identical to those of the third embodiment are indicated by corresponding reference numerals, and detailed description of these is omitted. Specifically, steps S410 to S450 of FIG. 11 correspond to those of the third embodiment. However if it is found in step S410 that this ECU 20 has not received the notification list then a step S470 is executed, to wait until a predetermined waiting interval for receiving that list has elapsed. If that interval elapses (i.e., a YES decision is reached in step S470) then this ECU 20 transmits a request signal for re-dispatching of the common cipher key, to the gateway ECU 10 (step S490). Operation then returns to step S410.

Furthermore with this fourth embodiment, if it is judged in step S430 that the new common cipher key has not yet been received, after the notification list has been received, then step S480 is executed, to wait until a predetermined interval has elapsed (i.e., a common cipher key waiting interval), i.e., with operation repetitively returning to step S450 until that interval has elapsed. When the common cipher key waiting interval has elapsed, operation proceeds to step S490, to transmit a request signal for re-execution of the key replacement operation. Operation then returns to step S410.

However if it is found in step S420 that this ECU 20 is not registered in the notification list (received in step S410), then this indicates that this ECU 20 does not require to participate in a key replacement operation at this time, so that operation proceeds to step S460, to wait to receive any further notification list that may be dispatched by the gateway ECU 10. Operation also proceeds to step S460 after a confirmation signal has been transmitted, in step S450. If a subsequent notification list is received, operation then returns to step S420, to determine whether steps 430 to 450 are to be executed, i.e., to determine if this ECU 20 is specified in that notification list.

Figure 12A:
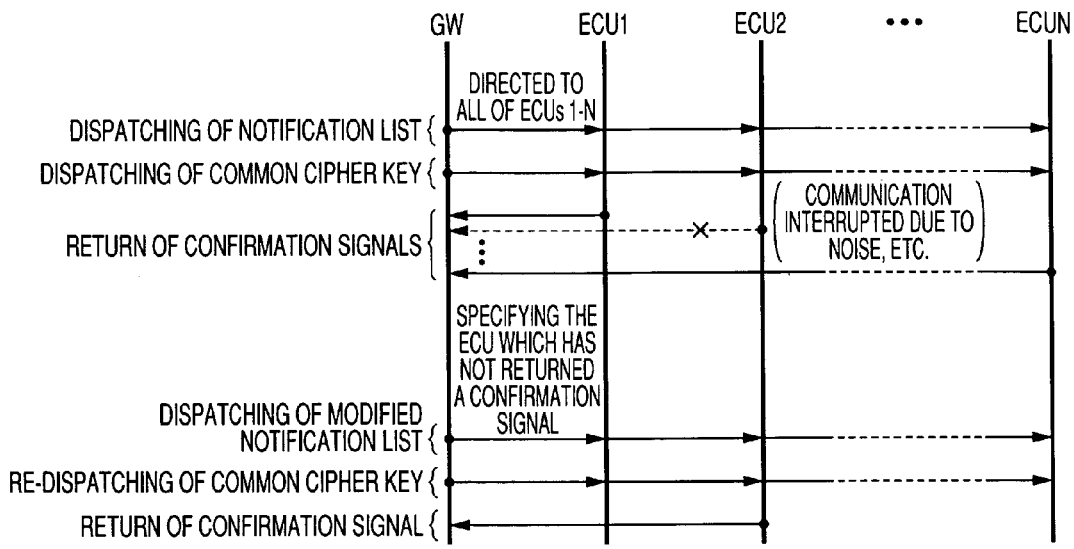
FIGS. 12A, 12B are diagrams for illustrating flows of data that occur during execution of confirmation processing in a cipher key replacement operation of the fourth embodiment.

The notification processing that is executed by the gateway ECU 10 and the ECUs 20 with this embodiment is illustrated in FIG. 12A, in which the ECUs 20 are indicated as ECU1 to ECUN. As shown, firstly a notification list is dispatched concurrently to all of the ECUs 20 that are to share the new common cipher key, using the broadcast communication mode, then that key (encrypted using the class cipher key) is dispatched concurrently to all of the ECUs 20, using the broadcast communication mode.

Each ECU 20 that is registered in the notification list and which receives the encrypted common cipher key, then decrypts and stores that key, and returns a confirmation signal (encrypted using the class cipher key) to the gateway ECU 10.

If confirmation signal(s) from one or more of the ECUs 20 (in the example of FIG. 12A, ECU2) are not received by the gateway ECU 10, due to a communication failure resulting from electrical noise, etc., then the gateway ECU 10 transmits a modified notification list as described above that identifies each of the unconfirmed ECUs (i.e., in the example of FIG. 12A, the ECU2) to each of the ECUs 20, in the broadcast communication mode. The gateway ECU 10 then again transmits the same common cipher key that was precedingly dispatched, in the broadcast communication mode, to all of the ECUs 20.

In that way, it is ensured that a confirmation signal will only be returned from each ECU that was specified in the modified notification list as an unconfirmed ECU, after each such ECU has successfully received and stored the common cipher key.

Figure 12B:
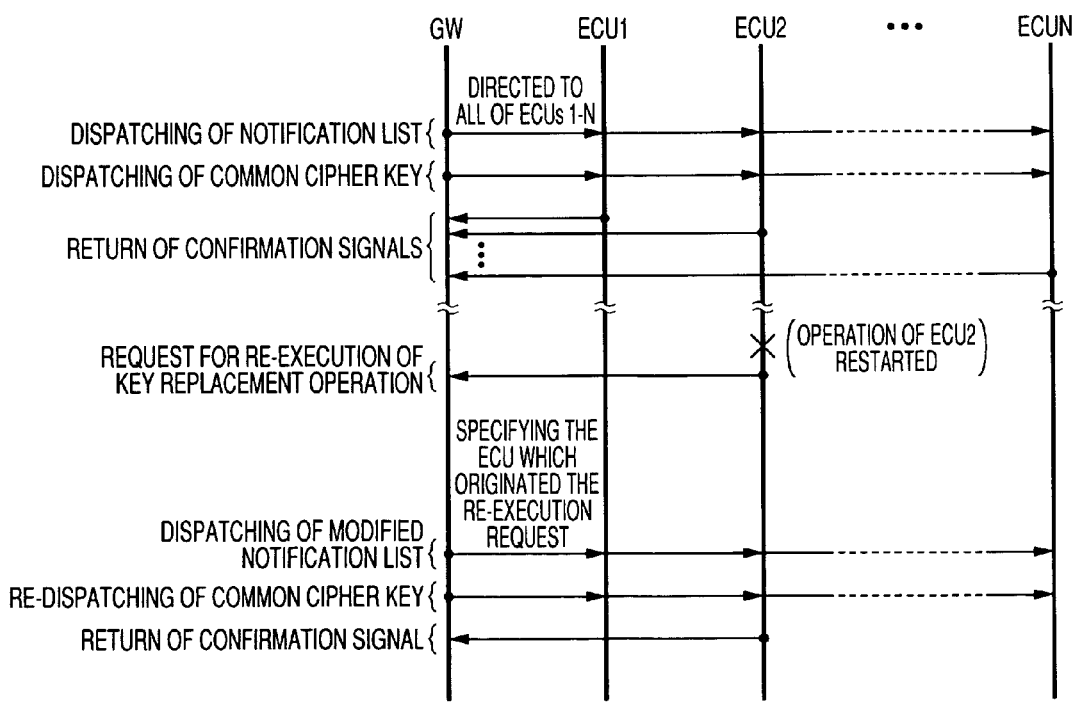

FIG. 12B illustrates the processing of this embodiment for the case in which an ECU 20 requests re-dispatching of the common cipher key. In the example of FIG. 12B it is assumed that the ECU2 was initially in operation (i.e., following switch-on of the vehicle ignition, and returned a confirmation signal to the gateway ECU 10 after the common cipher key was initially dispatched, but that the ECU2 subsequently become temporarily inactivated, then was reactivated. As a result, the ECU2 again starts the processing sequence shown in FIG. 11, and after it is determined that the waiting interval for receiving the notification list has elapsed (by execution of steps S410, S470 as described above), ECU2 transmits to the gateway ECU 10 a request signal for re-dispatching of the common cipher key.

On receiving that signal, the gateway ECU 10 generates a modified notification list which specifies CCU2 as the source of the re-execution request signal, and transmits that modified notification list to all of the ECUs 20. The gateway ECU 10 then re-dispatches the precedingly dispatched common cipher key to all of the ECUs 20. The ECU2 can thereby acquire the common cipher key, and will then return a confirmation signal to the gateway ECU 10.

Thus with this embodiment, only the ECU2 will return a confirmation signal. In that case, the gateway ECU 10 will judge (in step S340 of FIG. 10) whether a confirmation signal has been received from the ECU that is specified in the modified notification list as a re-dispatching request source (i.e., ECU2). If so, then the processing for notification of key confirmation results to the anti-theft apparatus 30 in step S360, and the subsequent processing of steps S370, S380, is performed, while otherwise, re-dispatching of the modified notification list and of the common cipher key is performed.

It can thus be understood that with the processing of this embodiment, in addition to the processing of the third embodiment, the gateway ECU 10 re-executes the key replacement operation when it is detected that any ECU which is listed in notification list has not returned a confirmation signal in response to dispatching of the common cipher key by the gateway ECU 10. In addition with this embodiment, when an ECU 20 does not receive the notification list or the common cipher key from the gateway ECU 10, it transmits a request signal for re-execution of the key replacement operation to the gateway ECU 10.

Hence with this embodiment, not only can the advantageous effects of the third embodiment be obtained, but also, when a communication failure occurs or when operation of a ECU 20 is temporarily halted then restarted for some reason, it is ensured that the currently valid version of the common cipher key will continue to be shared by all of the ECUs 20 which are registered in the notification list. Thus if any communication interruption occurs due to some external cause such as electrical noise, it is ensured that this will not affect the exchange of encrypted data between the ECUs 20, so long as there is no failure or abnormality of operation of the gateway ECU 10 or the ECUs 20.

Furthermore with this embodiment, only those ECUs 20 that are registered in the notification list can participate in a key replacement operation. Furthermore, each time that a key re-dispatching operation is executed, the gateway ECU 10 does not need to perform any processing relating to those ECUs 20 that have already received and stored the currently valid version of the common cipher key (i.e., acquired in a preceding key replacement operation). Thus, unnecessary processing is eliminated, so that the overall amount of processing can be minimized.

Fifth Embodiment

A fifth embodiment will be described in the following, which differs from the first embodiment only in that each ECU 20 incorporates a random number generating apparatus (referred to in the following as the second random number generating apparatus), which is different from that used by the gateway ECU 10 in generating common cipher keys, and with respect to parts of the GW-side confirmation processing that is executed by the microcomputer 16 of the gateway ECU 10 and the ECU-side confirmation processing that is executed by the microcomputer 24 of each ECU 20. The following description is concerned mainly with these points of difference.

In the GW-side confirmation processing of the fifth embodiment, the processing shown in the flow diagram of FIG. 13A is inserted to replace steps S130 to S140 of the first embodiment, while in addition in the ECU-side confirmation processing, step S230 of the first embodiment is replaced by the processing sequence shown in the flow diagram of FIG. 13B. In other respects, the processing executed with the fifth embodiment is identical to that of the first embodiment, with steps corresponding to those of the first embodiment being referred to in the following by the reference numerals used in FIG. 2, described above.

Specifically, in the GW-side confirmation processing, steps S110 to S120 are identical to those of the first embodiment. After dispatching of the common cipher key has been performed in step 120, step S510 of FIG. 13A is executed by the gateway ECU 10, to judge whether a confirmation signal has been received. If there is a NO decision, operation proceeds to step S540, to judge whether a predetermined waiting time for receiving all of the confirmation signals from each of the ECUs 20 has elapsed. If that interval has elapsed, operation proceeds to step S150 (shown in FIG. 2, for the first embodiment) described hereinabove. As described hereinafter, each confirmation signal contains a different random number.

If it is found in step S510 that a confirmation signal has been received, that signal is decrypted using the class cipher key, to extract the random number. A predetermined confirmation indicator (e.g., a specific bit sequence) is then attached to that random number, to produce a confirmation response signal. The confirmation response signal is then encrypted, using the common cipher key that was generated in step S110 (as described referring to FIG. 2 for the first embodiment), and the encrypted confirmation response signal is then transmitted to the ECU 20 which sent the corresponding confirmation signal (step S520).

With this embodiment, the same confirmation indicator is stored in memory beforehand by the gateway ECU 10 and each of the ECUs 20, e.g., when these are installed in the vehicle as authorized components, by the manufacturer, service center, etc. Thus, an unauthorized component (e.g., stolen ECU) that may be installed thereafter cannot attach the correct confirmation indicator.

It should be noted that other methods could be envisaged for ensuring that the gateway ECU 10 and each of the ECUs 20 (when these are authorized components) have the same confirmation indicator at all times, e.g., the gateway ECU 10 could be configured to transmit to each ECU 20 information for use in deriving the correct confirmation indicator (periodically, or at each ignition switch-on).

A decision is made as to whether respective confirmation signals have been received from all of the ECUs 20 that are to share the common cipher key (step S530). If it is found that confirmation signals have not yet been received from one or more ECUs 20, then operation proceeds to step 5540, while if respective confirmation signals have been received from all of the ECUs 20 concerned, then step S150 shown in FIG. 2 is executed.

Thus if there is a YES decision reached in either of steps S540 or S530, steps S150 to S190 are then executed in the same way as for the first embodiment.

In the ECU-side confirmation processing executed with this embodiment, steps S210, S220 (shown in FIG. 2) are performed in the same way as for the first embodiment. If it has been found in step S210 that the common cipher key has been received from the gateway ECU 10, then after step S220, a random number is generated (in step S610) by the second random number generating apparatus, to be used as a confirmation signal. That random number is stored in memory, then is encrypted using the newly received common cipher key. The resultant encrypted confirmation signal is then transmitted to the gateway ECU 10 (step S620).

Thereafter in step S630 a decision is made as to whether a confirmation response signal intended for this ECU 20 has been received from the gateway ECU 10. If that signal has not yet been received, step S640 is executed to judge whether a predetermined waiting interval for receiving the confirmation response signal has elapsed, and if it has not elapsed, operation then returns to step S630.

If it is found in step S630 that encrypted data conveying the confirmation response signal has been received, then the data are decrypted, and a decision is made as to whether both the random number and the confirmation indicator of the received confirmation response signal respectively match the correct random number (i.e., that was transmitted by this ECU 20 in the confirmation signal) and correct confirmation indicator (step S650). If a correct match is found, then operation proceeds to step S240 and the subsequent processing is identical to that for the first embodiment. If a correct match is not obtained for either or both of the random number and confirmation indicator, or if it is found in step S640 that the waiting interval has elapsed, then this signifies that there is an abnormal condition of the gateway ECU 10, and step S660 is then executed, in which some action is taken that has been predetermined for handling an abnormal ending of this processing, e.g., operation of this ECU 20 may be terminated.

Figure 14:
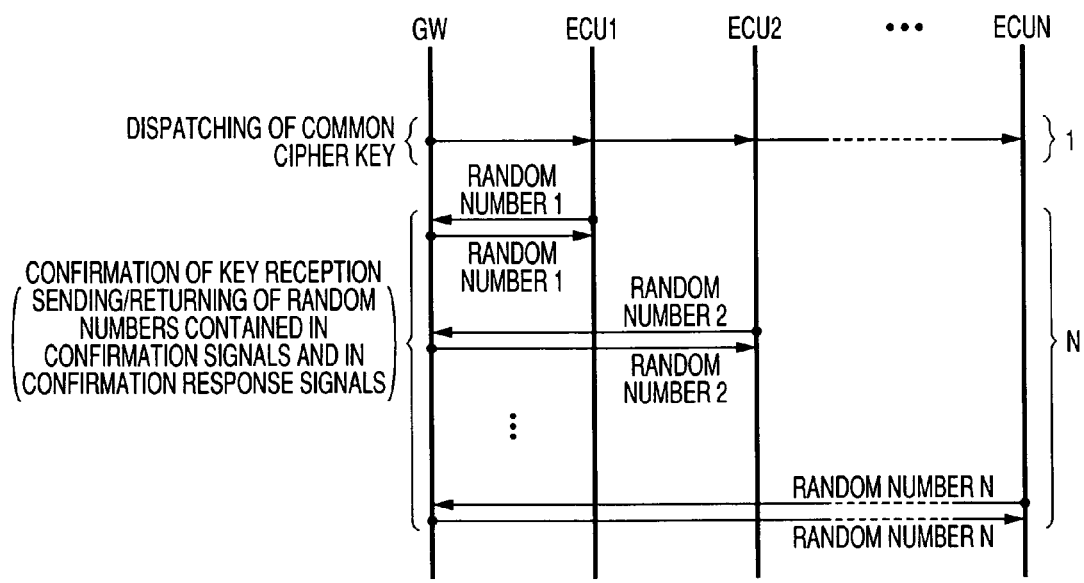
FIG. 14 is a diagram for illustrating flows of data that occur during execution of confirmation processing in a cipher key replacement operation of the fifth embodiment.
Figure 15A:
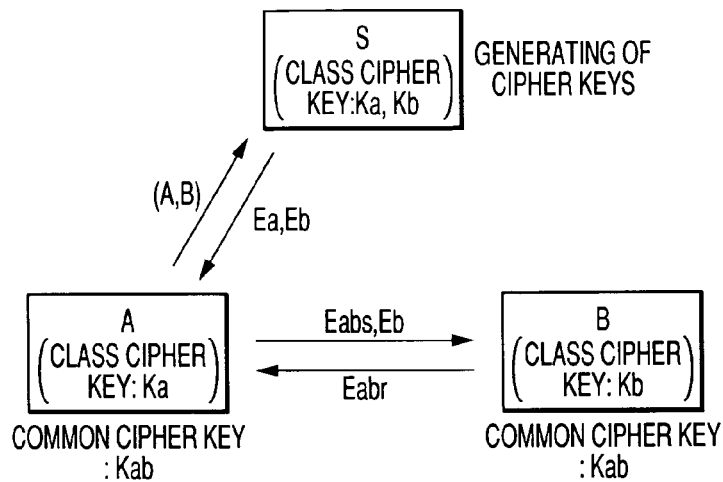
FIGS. 15A, 15B are diagrams for use in describing a prior art apparatus.
Figure 15B:
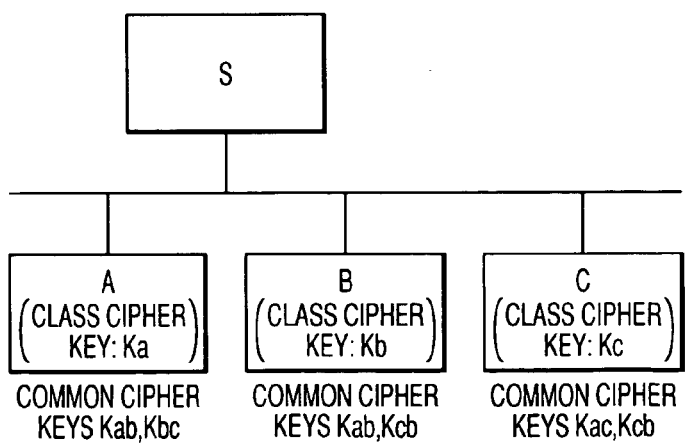
Figure 16:
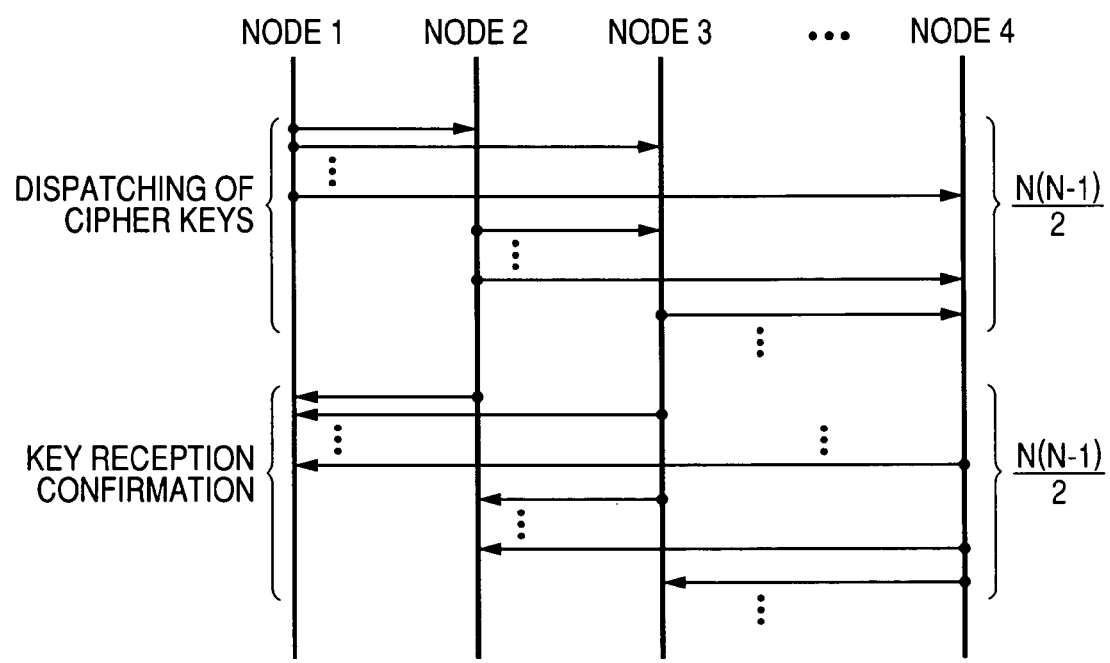
FIG. 16 is a diagram for illustrating flows of data that occur during execution of a cipher key replacement operation with the prior art apparatus.

Thus with the confirmation processing that is executed by the gateway ECU 10 and each of the ECUs 20 of this embodiment, as illustrated in FIG. 14, the common cipher key that has been generated by the gateway ECU 10 and encrypted using the class cipher key is dispatched concurrently, in the broadcast communication mode) to all of the ECUs 20 (in FIG. 14 ECU1 to ECUN) that are to share the common cipher key. When an ECU 20 receives that encrypted common cipher key, it decrypts and stores the key, then generates a random number as a confirmation signal, encrypts the confirmation signal using the received common cipher key, and transmits the resultant encrypted data back to the gateway ECU 10. When the gateway ECU 10 receives the encrypted confirmation signal, it decrypts the signal to obtain the random number, then attaches a confirmation indicator to that random number to form a confirmation response signal. That confirmation response signal is then encrypted, using the common cipher key, and the resultant encrypted data are sent back to the ECU 20 which transmitted the confirmation signal.

That ECU 20 then decrypts the confirmation response signal, to obtain the random number and confirmation indicator therein, and compares these with the correct confirmation indicator and the random number which that ECU 20 had transmitted in the confirmation signal. If there is a correct match, this signifies that the gateway ECU 10 is an authorized (i.e., valid) component, which is functioning correctly.

It can thus be understood that with this fifth embodiment, in addition to the processing of the first embodiment, a confirmation response signal is sent by the gateway ECU 10 to each ECU 20 from which a confirmation signal is received. That confirmation response signal includes a confirmation indicator that is available only to a gateway ECU 10 and ECUs 20 which are each authorized components, i.e., which cannot be stolen items, for example. When an ECU 20 receives such a confirmation response signal, it can reliably judge whether or not the gateway ECU 10 which transmitted that signal is operating correctly, and also is a valid, authorized component, which holds the correct confirmation indicator. In that way, the use of a non-valid ECU as the gateway ECU 10 can be reliably prevented, and defective functioning of the gateway ECU 10 can be detected by the ECUs 20.

The fifth embodiment has been described for the case of the processing of FIG. 13A being adapted to the first embodiment. However it would be equally possible to adapt the processing of FIG. 13A for insertion to replace steps S130~S140 of the processing executed by the gateway ECU 10 in the second embodiment, or steps S340~350 of the processing executed by the gateway ECU 10 in the third or the fourth embodiments. Similarly, it would be equally possible to adapt the processing of FIG. 13B to replace step S230 of the processing executed by each ECU 20 in the second embodiment, or to replace step S450 of the processing executed by each ECU 20 in the third or the fourth embodiments.

Other Embodiments

It should be noted that the present invention is not limited to the above embodiments, and that various other embodiments could be envisaged, for example as follows.

Firstly, with the above embodiments, the ECUs 20 connected to the vehicle LAN 3 and the ECUs 20 connected to the vehicle LAN 5 share the same common cipher key. However it would be equally possible to arrange that the ECUs 20 of LAN 3 and those of LAN 5 have respectively different common cipher keys. This can be done by providing the gateway ECU 10 with a function whereby when encrypted data are received by the gateway ECU 10 for transfer between the LANs 3 and 5, the data are first decrypted using one common cipher key, then encrypted using the other common cipher key, before being transferred to the appropriate LAN.

Furthermore with the above embodiments, a code processing section 23 and a microcomputer 24 are respectively incorporated in each ECU 20. However it would be possible to configure the system with ECUs that are continuously in operation, i.e., irrespective of whether the vehicle ignition is switched on or off, and that case, the code processing section 23 could be omitted, with its functions being assigned to the microcomputer 24.

Moreover with the above embodiments, each of the vehicle LANs 3 and 5 has a bus-type configuration. However it would be equally possible to use other types of vehicle LAN, for example having the star configuration, or a combination of the bus configuration and star configuration (e.g., Flex Ray), etc.

What is claimed is:

1. A communication system comprising at least one LAN (Local Area Network), said communication system having at least three nodes connected thereto, wherein said nodes perform mutual encrypted communication by utilizing a common cipher key for encrypting and decrypting communication data, and wherein:

one of said nodes functions as a main node and remaining ones of said nodes function as respective secondary nodes which receive said common cipher key from said main node, and said main node comprises means for executing a key replacement operation at successive regular or irregular intervals, said key replacement operation comprising generating a cipher key to be utilized as said common cipher key, and transmitting said generated common cipher key to each of said secondary nodes via said LAN by employing a broadcast communication mode; and each of said nodes is provided beforehand with a class cipher key, said class cipher key being a cipher key that is identical for each of said nodes and is continuously held by each of said nodes, said main node comprises means for encrypting said common cipher key by using said class cipher key, and transmitting said common cipher key in encrypted form in said key replacement operation, and each of said secondary nodes comprises means for decrypting said encrypted common cipher key when received from said main node, by using said class cipher key.

2. A communication system according to claim 1, wherein said key replacement operation is executed each time that operation of said communication system is restarted.

3. A communication system according to claim 2 wherein following said restarting of operation of said communication system, said key replacement operation is executed in parallel with initialization of respective data processing sections of said nodes, and said key replacement operation is executed within an interval during which said initialization is performed to completion.

4. A communication system according to claim 1, wherein each said secondary node comprises means responsive to receiving said common cipher key from said main node for transmitting a confirmation signal to said main node via said LAN, and said main node comprises means for detecting a condition, following execution of said key replacement operation, in which said confirmation signal has not been received from a secondary node that is permitted to share said common cipher key, and for retransmitting said common cipher key to said secondary nodes by said broadcast communication mode when said condition is detected.

5. A communication system according to claim 4, wherein said main node comprises means for generating a key confirmation list following execution of said key replacement operation, and for transmitting said key confirmation list to each of said secondary nodes via said LAN using said broadcast communication mode, said key confirmation list having registered therein each of said secondary nodes from which a confirmation signal has been received, and each of said secondary nodes comprises means for detecting a condition whereby said secondary node is omitted from said key confirmation list, and for responding to said retransmitting of said common cipher key by transmitting said confirmation signal only when said condition is detected.

6. A communication system according to claim 1, wherein said main node comprises means for generating a notification list having registered therein each of said secondary nodes that is permitted to share said common cipher key, and for transmitting said notification list to each of said secondary nodes via said LAN using said broadcast communication mode, prior to executing said key replacement operation, and each said secondary node comprises means for detecting a condition whereby said each secondary node is registered in said notification list and also has received said common cipher key in said key replacement operation that is executed following said transmitting of said notification list, and for transmitting a confirmation signal via said LAN to said main node when said condition is detected.

7. A communication system according to claim 6, wherein said main node comprises means for detecting a condition, following execution of said key replacement operation, in which said confirmation signal has not been received from a secondary node that is registered in said notification list, and, when said condition is detected, generating a modified notification list which specifies said secondary node from which a confirmation signal has not been received, transmitting said modified notification list to each of said secondary nodes via said LAN, using said broadcast communication mode and retransmitting said common cipher key to said secondary nodes via said LAN using said broadcast communication mode.

8. A communication system according to claim 4, wherein each said secondary node comprises means for generating a random number to constitute said confirmation signal when said common cipher key has been received in said key replacement operation, encrypting said confirmation signal by using said received common cipher key, and transmitting said encrypted confirmation signal via said LAN to said main node; and said main node comprises means responsive to receiving said encrypted confirmation signal from a secondary node for decrypting said encrypted confirmation signal to obtain said random number, attaching data constituting a predetermined confirmation indicator to said random number to thereby form a confirmation response signal, encrypting said confirmation response signal by using said common cipher key, and transmitting said encrypted confirmation response signal via said LAN to said secondary node which transmitted said encrypted confirmation signal.

9. A communication system according to claim 1, wherein each of said secondary nodes comprises means for detecting a condition whereby said common cipher key has not yet been received from said main node after a predetermined waiting interval has elapsed following a time point at which said key replacement operation has begun, and for transmitting to said main node via said LAN a request signal for requesting execution of said key replacement operation when said condition is detected.

10. In a communication system having a plurality of nodes and at least one LAN (Local Area Network) utilized for encrypted communication between said nodes, a cipher key dispatching apparatus that is constituted by one of said nodes, comprising cipher key generating means for successively generating, at predetermined timings, respectively different versions of a common cipher key for use in encrypting and decrypting of communication data, key dispatching means provided beforehand with a class cipher key, for using said class cipher key to encrypt said common cipher key generated by said cipher key generating means, and transmitting a resultant encrypted common cipher key via said LAN by a broadcast communication mode, key confirmation list generating means for receiving confirmation signals transmitted via said LAN from other ones of said nodes upon receiving said encrypted common cipher key, and generating a key confirmation list having registered therein each of said nodes which have transmitted said confirmation signals, and list dispatching means for transmitting said key confirmation list to said other nodes via said LAN, using a broadcast communication mode.

11. A cipher key dispatching apparatus according to claim 10, wherein a specific set of said other nodes are predetermined as being permitted to share said common cipher key, and wherein said cipher key dispatching apparatus comprises re-dispatching means for detecting a condition whereby at least one of said nodes that are permitted to share said common cipher key has not transmitted a confirmation signal, and for executing retransmitting of said common cipher key via said LAN by using said broadcast communication mode, when said condition is detected.

12. A cipher key dispatching apparatus according to claim 10, wherein said list generating means generates said key confirmation list as a list of nodes from which respective confirmation signals have been received before a predetermined waiting interval has elapsed following a commencement of transmitting said common cipher key by said key dispatching means.

13. In a communication system having a plurality of nodes and at least one LAN (Local Area Network) utilized for encrypted communication between said nodes, a cipher key dispatching apparatus that is constituted by one of said nodes, comprising
cipher key generating means for generating, at predetermined timings, successively different versions of a common cipher key for use in encrypting and decrypting of communication data,
notification list generating means for generating a notification list as a list of nodes which are permitted to share said common cipher key, and for transmitting said notification list via said LAN using a broadcast communication mode, and
key dispatching means, for using a class cipher key to encrypt each said common cipher key generated by said cipher key generating means and transmitting said encrypted common cipher key via said LAN by a broadcast communication mode, said class cipher key being provided beforehand to each of said nodes which are permitted to share each said common cipher key.

14. A key dispatching apparatus according to claim 13, comprising re-dispatching means for
receiving respective confirmation signals transmitted from nodes which have received said common cipher key dispatched by said key dispatching means,
detecting a condition whereby one of said nodes which are listed in said notification list has not transmitted a confirmation signal,
when said condition is detected, generating a modified notification list which specifies said node which has not transmitted a confirmation signal, and
transmitting said modified notification list and re-transmitting said common cipher key via said LAN.

15. A key dispatching apparatus according to claim 14, wherein said re-dispatching means utilizes said broadcast communication mode to transmit said modified notification list and re-transmit said common cipher key via said LAN.

16. A key dispatching apparatus according to claim 10, wherein each said confirmation signal comprises a random number having data constituting a predetermined confirmation indicator attached thereto, and wherein said key dispatching apparatus comprises confirmation response signal transmitting means for
decrypting a received encrypted confirmation signal to extract said random number,
attaching data constituting a predetermined confirmation indicator to said extracted random number, to constitute a confirmation response signal,
encrypting said confirmation signal by using said common cipher key, and
transmitting a resultant encrypted confirmation response signal via said LAN to a node which originated said confirmation signal.

17. In a communication system having a plurality of nodes and at least one LAN (Local Area Network) utilized for encrypted communication between said nodes, respective code processing apparatuses constituted by respective ones of a plurality of said nodes, each said code processing apparatus comprising
cipher key receiving means, for receiving via said LAN a common cipher key that has been encrypted by using a predetermined class cipher key, and responsive to receiving said common cipher key for generating a confirmation signal and transmitting said confirmation signal via said LAN to a source of said received common cipher key, and
encrypting processing means provided beforehand with said class cipher key, for decrypting said received common cipher key and utilizing said common cipher key to perform encrypting and decrypting of communication data that are transmitted and received via said LAN.

18. A code processing apparatus according to claim 17, comprising notification list receiving means for
receiving from said source of said received common cipher key a key confirmation list having registered therein each of respective nodes from which a confirmation signal has been received by said source,
judging whether a node corresponding to said code processing apparatus is registered in said key confirmation list, and
when said corresponding node is found to be registered in said key confirmation list, inhibiting operation of said cipher key receiving means.

19. A code processing apparatus according to claim 16, comprising request transmitting means for detecting a first condition whereby said common cipher key has not been received after a predetermined waiting interval has elapsed following a commencement of operation of said code processing apparatus and a second condition whereby said confirmation signal has been transmitted by said cipher key receiving means but said corresponding node is subsequently not found to be registered in said key confirmation list, and responsive to detection of either of said first and second conditions for transmitting a request signal via said LAN to said source of said transmitted common cipher key, to request retransmission of said common cipher key.

20. A code processing apparatus according to claim 15, comprising notification list receiving means for
receiving via said LAN a notification list which indicates respective ones of said nodes as being permitted to share said common cipher key,
judging whether said node constituting said code processing apparatus is registered in said notification list, and
when said node is found to be registered in said notification list, initiating operation of said cipher key receiving means.

21. A code processing apparatus according to claim 20, comprising request transmitting means for detecting a first condition whereby said notification list has not been received after a first predetermined waiting interval has elapsed following a commencement of operation of said code processing apparatus and a second condition whereby a second predetermined waiting interval for receiving said common cipher key has elapsed following a time point at which said notification list is received, and responsive to detection of either of said first and second conditions for transmitting a request signal via said LAN to said source of said transmitted common cipher key, to request retransmission of said common cipher key.

22. A code processing apparatus according to claim 17, wherein said cipher key receiving means generates said confirmation signal as a random number, encrypts said confirmation signal by utilizing said common cipher key, and transmits said confirmation signal in encrypted form, and comprising abnormality judgement means for detecting a condition whereby
a confirmation response signal is received via said LAN in response to said confirmation signal, said confirmation response signal is decrypted to obtain a random number and confirmation indicator contained therein, and said random number does not match said random number contained in said confirmation signal or said confirmation indicator does not match said confirmation indicator that is held by said code processing apparatus, and for judging that there is an abnormality of functioning of said source which transmits said common cipher key, when said condition is detected.

23. An anti-theft apparatus installed in a vehicle having a communication system in which a plurality of electronic control units perform mutual encrypted communication via a vehicle LAN (Local Area Network) and in which key replacement operations are executed for updating a common cipher key that is used in common by said electronic control units for encrypting and decrypting transmitted and received communication data to perform said encrypted communication, wherein said anti-theft apparatus comprises abnormality handling means responsive to an occurrence of abnormality of results obtained from a key replacement operation for executing at least one of a plurality of predetermined operations which include emitting warning indications in the vicinity of said vehicle, transmitting a report to a predetermined apparatus that is external to said vehicle, and inhibiting a predetermined specific form of control of said vehicle.

* * * * *